United States Patent [19]

Mitsui et al.

[11] Patent Number: 4,620,624

[45] Date of Patent: Nov. 4, 1986

[54] AUTOMATIC CLUTCH CONTROL SYSTEM

[75] Inventors: Tsutomu Mitsui, Chiryu; Hideyuki Kobayashi, Toyota; Kouichiro Hirosawa, Kariya, all of Japan

[73] Assignee: Aisin Seiki Kabushikikaisha, Aichi, Japan

[21] Appl. No.: 479,543

[22] Filed: Mar. 28, 1983

[30] Foreign Application Priority Data

Mar. 31, 1982 [JP] Japan ................................ 57-52901

[51] Int. Cl.$^4$ ............................................ B60K 41/02
[52] U.S. Cl. .............................. 192/0.076; 192/0.096
[58] Field of Search .............. 192/0.032, 0.076, 0.096, 192/0.092, 103 F, 0.033, 0.075

[56] References Cited

U.S. PATENT DOCUMENTS

| 4,019,614 | 4/1977 | Prenzel et al. | 192/103 F |
| 4,343,387 | 8/1982 | Hofbauer | 192/0.092 X |
| 4,456,107 | 6/1984 | Ito et al. | 192/0.076 X |
| 4,475,637 | 10/1984 | Oguma et al. | 192/0.076 X |
| 4,476,970 | 10/1984 | Ito | 192/0.092 X |

FOREIGN PATENT DOCUMENTS 26020 7/1978 Japan .

Primary Examiner—Rodney H. Bonck
Attorney, Agent, or Firm—Sughrue, Mion, Zinn, Macpeak & Seas

[57] ABSTRACT

System is provided for controlling the pressure with which a clutch is engaged, with the throttle opening and the rotational speed of a driven shaft of the clutch. A microprocessor reads a throttle opening and the rotational speed of the driven shaft of the clutch at a time interval of 0.4 sec, and accesses a particular group of controlling data which control the clutch engagement and which are grouped together as a function of a time lapse 1 as well as the read values of these parameters. During the interval of 0.4 sec, the microprocessor sequentially outputs the controlling data of the particular group with a time subinterval of 0.05 sec. The system detects a difference between the last data of a preceding particular group and the first data of a subsequent particular group at the renewal of the data group and then corrects subsequent data for controlling clutch control pressure so as to smooth the change of the clutch control pressure.

9 Claims, 33 Drawing Figures

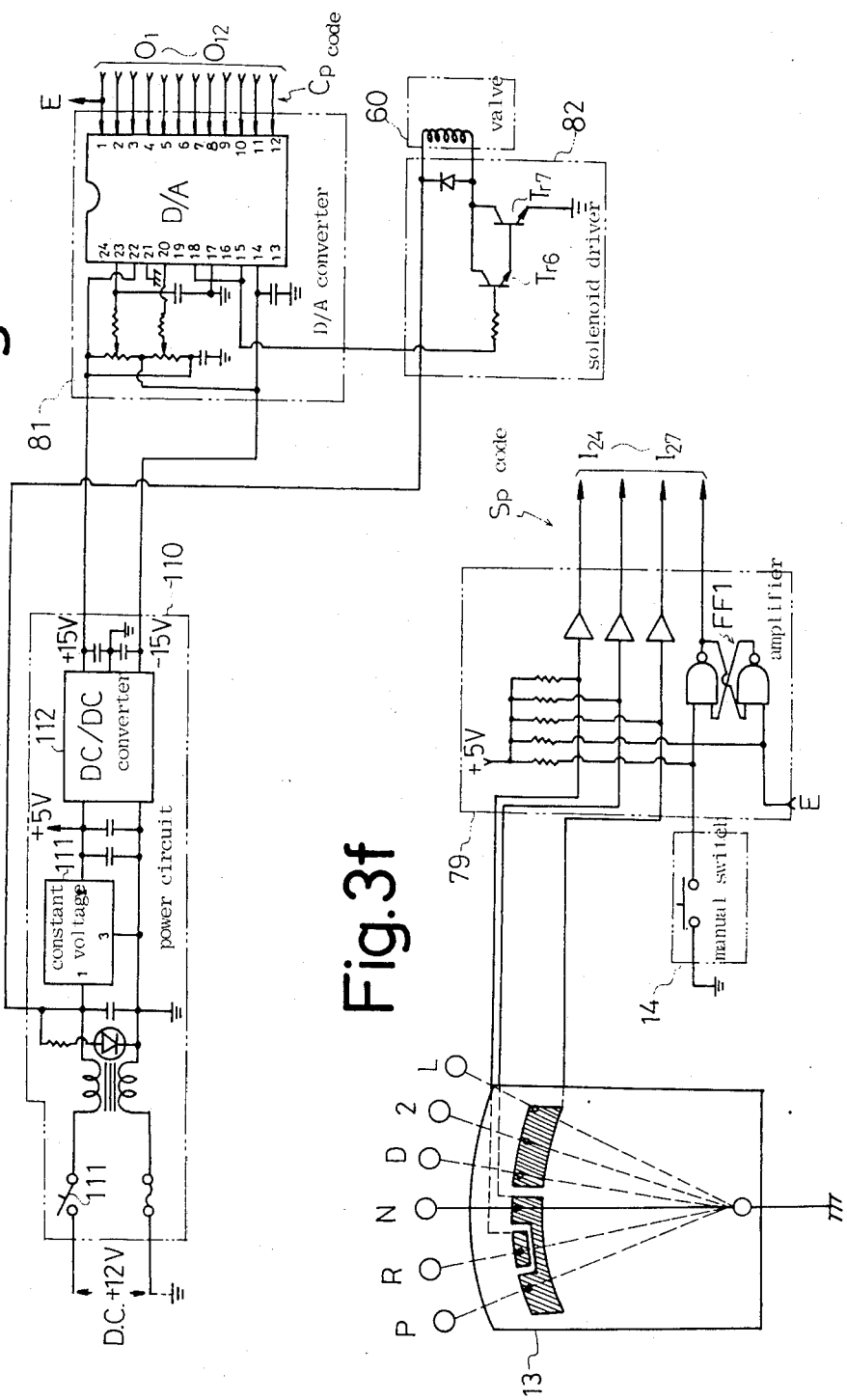

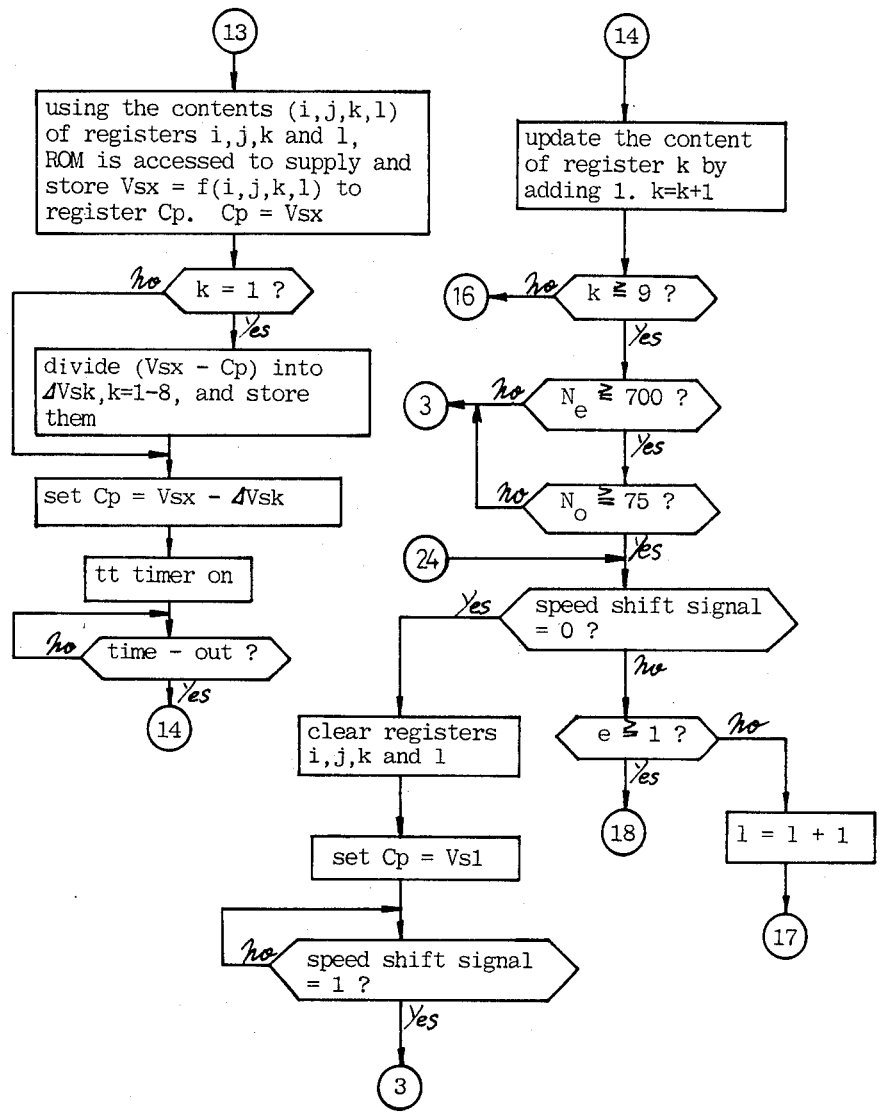

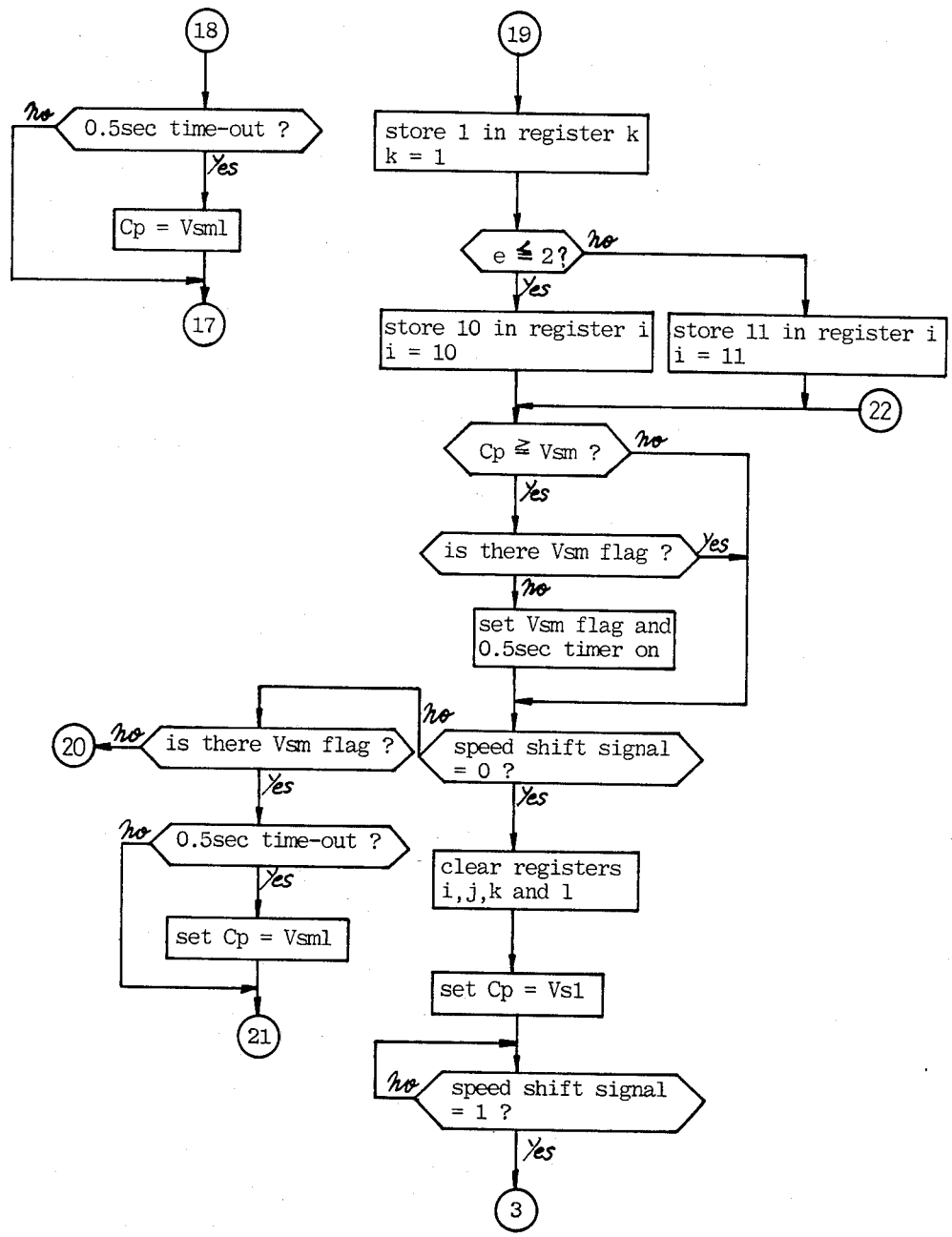

AUTOMATIC CLUTCH CONTROL SYSTEM

BACKGROUND OF THE INVENTION

The invention relates to an automatic clutch control system which automatically controls the coupling of a driven shaft to a drive shaft in a clutch mounted on an automobile in accordance with a decision rendered by an electronic circuit.

In a conventional automatic clutch arrangement, to achieve an accurate engagement of a clutch without experiencing shock, there has been proposed a clutch arrangement in which a clutch transmits rotating power to an output shaft. The arrangement comprises a power sensor for detecting the number of revolutions of the output shaft, a clutch sensor for detecting the number of revolutions of the clutch, a comparator for determining the relative magnitude of the number of revolutions of both sensors, a parameter of follow-up control responsive to an output from the comparator to activate the clutch for engagement as the number of revolutions of the output shaft increases whenever the number of revolutions of the output shaft is higher than that of the clutch, and an automatic engaging circuit responsive to an output from the comparator and operating whenever the number of revolutions of the clutch is higher to deactuate the follow-up control and to terminate automatically the engagement of the clutch within a given time interval. In this manner, the relative magnitude of the number of revolutions of the engine and the clutch is determined in an electrical manner, and whenever the number of revolutions of the engine is higher than that of the clutch, an engagement of the clutch occurs in response to the number of revolutions of the engine while whenever the number of revolutions of the engine is lower than that of the clutch, an engagement of the clutch takes place in accordance with a difference therebetween. (See Japanese Patent Publication No. 26,020/1798, filed Mar. 26, 1971 and published July 31, 1978). In other words, the rotational speed of the engine is chosen as a main variable while a differential speed between the output shaft of the clutch (driven shaft) and the output shaft of the engine (the clutch drive shaft) is chosen as a parameter for controlling the clutch coupling power. To summarize, in a mode in which the vehicle is driven for running under the engine power, the clutch coupling power is controlled in a manner corresponding to the rotational speed of the engine, while, in an engine brake mode, the clutch coupling power is controlled as a particular function of time. Consequently, the slip rate of the clutch depends on the rotational speed of the engine, and the correlation between the engine power and a load on the vehicle may be be proper.

To achieve a proper engagement of a clutch for various running conditions of a vehicle, commonly assigned U.S. Pat. Nos. 4,518,068, 4,529,072 and 4,475,637 disclose a system for controlling the pressure with which a clutch is engaged, with a slip rate of the clutch, which is equal to the ratio of the rotational speed No of a driven shaft against the rotational speed Ne of a drive shaft, as a main parameter. The slip rate e corresponds to the rotational speed No and Ne of the driven shaft and the drive shaft respectively, therefore the clutch coupling power corresponds to running condition of the vehicle. A microprocessor of the system, in the first clutch control, initially applies to the clutch an engaging force of a reduced magnitude to detect the rate of change (dNe/dt) of the rotational speed Ne of the clutch drive shaft, which is utilized as indicative of the correlation between the loading and the engine power in determining a clutch turn-on response. Throttle opening is used to determine the engine power. The combination of the vehicle load and the engine power specifies a particular data group (Vsx=f(t)) having a proper clutch ON change rate (dVs/dt) in the first time segment l=0. The clutch controlling signal Vsx is changed at a time subinterval of $\Delta T=0.05$ sec. In the segment l=0, $$\sum_{K=1}^{8} \Delta t = 0.4 \text{ sec.}$$

After proceeding through the segment l=0, the clutch ON control enters the second time segment l=1. During the clutch ON control for the second time l=1, the actual slip rate e is utilized as indicative of the vehicle load, and the throttle opening is utilized as indicative of the engine power in the same manner as in the first time segment. These specify a particular group of clutch controlling data Vsx=f(t) having a proper clutch ON change rate (dVs/dt) for the second segment l=1. The clutch control signal Vsx is changed at a time subinterval of $\Delta t=tt$ sec. In the second segment l=1, $$\sum_{K=1}^{8} tt = 0.4 \text{ or } 0.8 \text{ sec.}$$

After proceeding through the time segment l=1, the clutch ON control in the third time segment l=2 is entered. This takes place in the similar manner as during the time segment l=1. A similar clutch ON control is repeated for the segments l=3, 4, . . . .

The aforesaid clutch control is executed by a microcomputer system having a center processing unit CPU (microprocessor or microcomputer), RAM and ROM. A program for executing the clutch control is stored in a ROM of CPU and/or an additional ROM. Also the data groups each of which will be specified by the throttle opening and the vehicle load dNe/dt as well as the data groups each of which will be specified by the throttle opening and the actual slip rate e=No/Ne are stored in the additional ROM. Each of the data groups includes 8 data which will be read out in order and have a specific change rate. Selection of a data group in turn and reading out of each data therein causes an increment of the clutch coupling power with a change rate which corresponds to the throttle opening as well as the vehicle load or the actual slip rate.

The clutch ON control in which the parameters including the throttle opening, the speed Ne and the speed No are read in and a clutch controlling data group is accessed by the parameters with a predetermined time segment period also each data of the data group is read out in succession with a short subinterval as described hereinbefore, may experience an abrupt acceleration or deceleration of the vehicle which may cause a shock to the vehicle and the driver by an abrupt change of the clutch control pressure due to a breakage of a continuity between a clutch control pressure indicated by the last data of a preceding data group and a clutch control pressure indicated by the first data of a subsequent data group. The breakage of the continuity may be experienced when a segmentation or a digitization is relatively rough to reduce a number of the data groups, when a change of the throttle opening is relatively first large or when a change of the vehicle load is relatively large due to a road condition.

SUMMARY OF THE INVENTION

It is an object of the invention to prevent the shock to the vehicle and the driver at the renewal of the data group.

The above object is achieved in accordance with the invention by calculating the difference between the last data of the preceding data group and the first data of the subsequent data group at the renewal of the data group and then corrects subsequent data for controlling clutch control pressure so as to smooth the change of the clutch control pressure.

In an embodiment of the invention, the difference between the last data of the preceding data group and the first data of the subsequent data group at the renewal of the data group is divided into one or more correction segments and then distributed to one or more data of the subsequent data group. In an another embodiment of the invention when the difference is not disregarded, another data group including a data which is substantially equal to the last data of the preceding data group and neither the first nor the last in said another group is selected, then the clutch control pressure is controlled with the data substantially equal to the last data of the preceding data group and another succeeding data of said another data group in succession with the short subinterval.

The invention of course may be practiced with the system disclosed aforesaid U.S. Pat. No. 4,518,068 and others, however in the selection of the data group (namely change rate of coupling force) by the throttle opening and the slip rate e, namely by the throttle opening, the rotational speed Ne of the drive shaft of the clutch and the rotational speed No of the driven shaft of the clutch, the slip rate e=Ne/No does not correspond to No nor Ne directly. Combinations of No and Ne are many for the same slip rate e. Normally No and Ne change respectively. The slip rate e remains constant when No and Ne changes with the same ratio. Thus the slip rate e is not a suitable parameter for selecting the data group. Also, the vehicle may experience uncomfortable shock because the vehicle may not start running and the rotational speed Ne of the engine may rise up when the throttle opening is small and the vehicle load is heavy, then the clutch may engage to start the vehicle moving with the rotational speed Ne of the engine falling rapidly even though the throttle opening becomes large, so that the rotational speed Ne of the engine may rise and fall repeatedly.

Therefore in a preferred embodiment of the invention, the vehicle load is detected after the rotational speed of the driven shaft of the clutch exceeds a predetermined one to specify a first data group with the vehicle load and the throttle opening, then the clutch coupling force is controlled with the data of the first data group. Thereafter specifying a second data group with the throttle opening and the rotational speed of the driven shaft of the clutch, the clutch coupling force is controlled with the data of the second data group. According to this clutch control, the rapid rising up and the stoppage of the engine are prevented, and thus a shock to the engine and the vehicle is prevented, by pre-setting the data in each of the data groups to data which will provide proper clutch coupling force at a specific rotational speed Ne of the engine and the throttle opening, those are assigned to the data group in which the data are included.

BRIEF DESCRIPTION OF THE DRAWINGS

FIGS. 3a, 3b, 3c, 3d, 3e and 3f are circuit diagrams showing the detail of individual components shown in block form in FIG. 2;

FIGS. 6a, 6b, 6c, 6d, 6e, 6f, 6g, 6h, 6i, 6j, 6k and 6l are flowcharts illustrating a clutch control operation by a central processing unit shown in FIG. 2 based upon program data stored in the read only memories also shown in FIG. 2;

DESCRIPTION OF EMBODIMENTS

Figure 1:
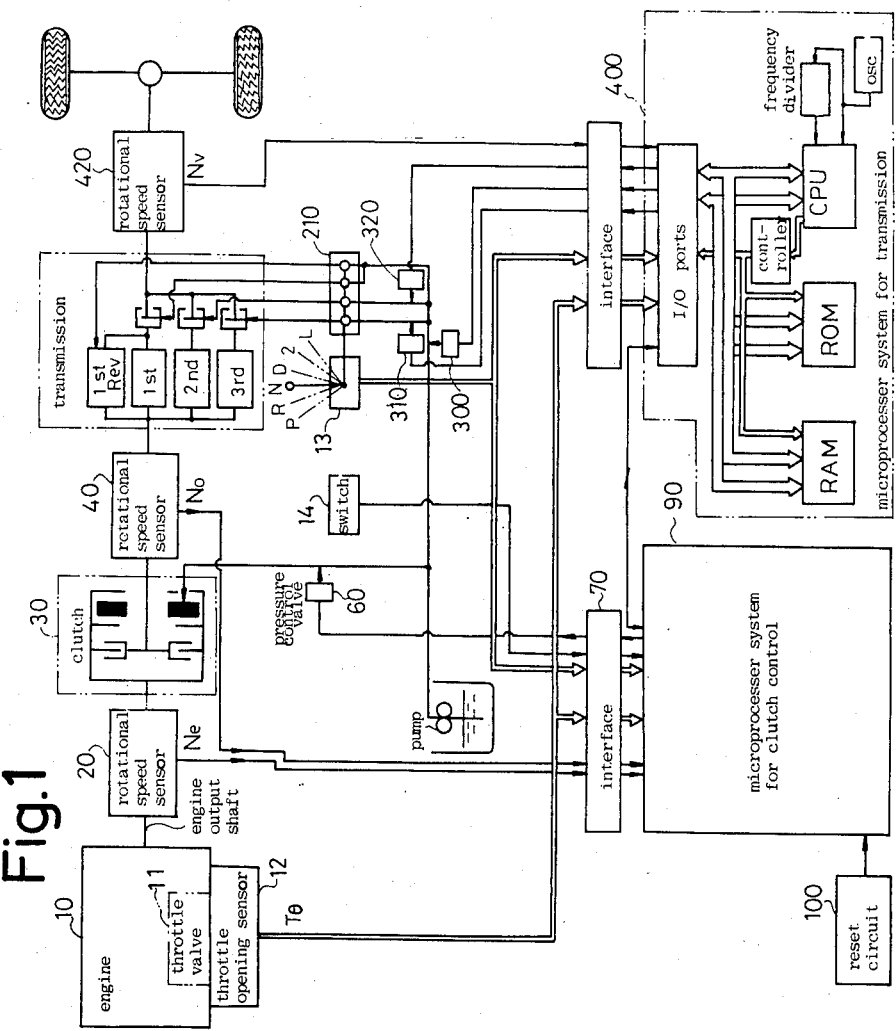
FIG. 1 is a block diagram of an embodiment of the invention, illustrating essential components used therein in combination with a vehicle.

Referring to the drawings, an embodiment of the invention will now be described. FIG. 1 is a block diagram illustrating the general arrangement of an embodiment of the invention, principally illustrating its relationship with an engine and a clutch mounted on a vehicle. Specifically, an engine 10 includes a throttle valve 11 having a rotary shaft, to which a throttle opening sensor 12 is coupled. A rotation sensor 20 is coupled to the drive shaft of a clutch 30, which represents the output shaft of the engine while another rotation sensor 40 is coupled to the driven shaft of the clutch. The clutch 30 shown comprises a wet multi-disc clutch as disclosed in U.S. Pat. Nos. 2,738,864 and 4,242,924, for example, The clutch includes a piston, to which an oil pressure is applied depending on the operative condition of a solenoid operated pressure regulator valve 60. It is to be understood that the switch valve 50 may be omitted while using a pressure regulator valve 60 which can be controlled to its fully closed position. It is to be noted here that the clutch 30 may also be replaced by a solenoid operated clutch as disclosed in U.S. Pat. Nos. 2,774,452 and 3,249,184, for example, with the valves 60 replaced by a solenoid driver. As a further alternative, any other clutch which can be electrically controlled may be used.

A shift lever which establishes a particular operational mode of a transmission is associated with a position sensor 13 which determines the established position thereof.

A detection signal from the throttle opening sensor 12, detection signals from the rotation sensors 20 and 40, and a position signal from the sensor 13 are fed to an interface (electrical processing circuit) 70 where they are amplified, waveform shaped and converted into digital versions to be applied to a microprocessor system 90. It will be noted that the interface 70 is also connected to a manual switch 14 which instructs a temporary clutch activation as when the traffic on the road is congested. Its status signal is applied to the microprocessor system 90.

The microprocessor system 90 includes a semiconductor read only memory (ROM or PROM) storing groups of clutch controlling signals. It reads the number of revolutions Ne of the clutch drive shaft, the number of revolutions No of the driven shaft, the throttle opening T$\theta$, the shift lever position Sp and the like in order to access the memory to read out clutch controlling data, which is supplied to the interface 70 to control the pressure regulator valve 60.

A drive shaft of a transmission is connected to a driven shaft of the clutch 30. A shift valve 210, an electro-magnetic ON/OFF valve 310, 320 and and electromagnetic pressure regulator valve 300 are included in a pressure control oil circuit (not shown) of the transmission. The valves 300 through 320 are controlled by a microprocessor system 400. Construction and operation of the pressure control oil circuit of the transmission, the electromagnetic valves as well as the system 400 is disclosed in detail in U.S. Pat. Nos. 4,314,340, 4,354,236 and 4,335,428. The system 400 sends the system 90 a signal indicating a change of a speed stage when the former decides to change the speed stage. The system 90 responding to the signal, releases the clutch 30 and sends the system 400 a signal indicating a release of the clutch 30. The system 400 responding to the signal, changes the speed stage of the transmission and withdraws the signal indicating the change of the speed stage. Responding to the withdrawal, the system 90 starts a control of a clutch coupling force, which is described in detail hereinafter.

Figure 2:
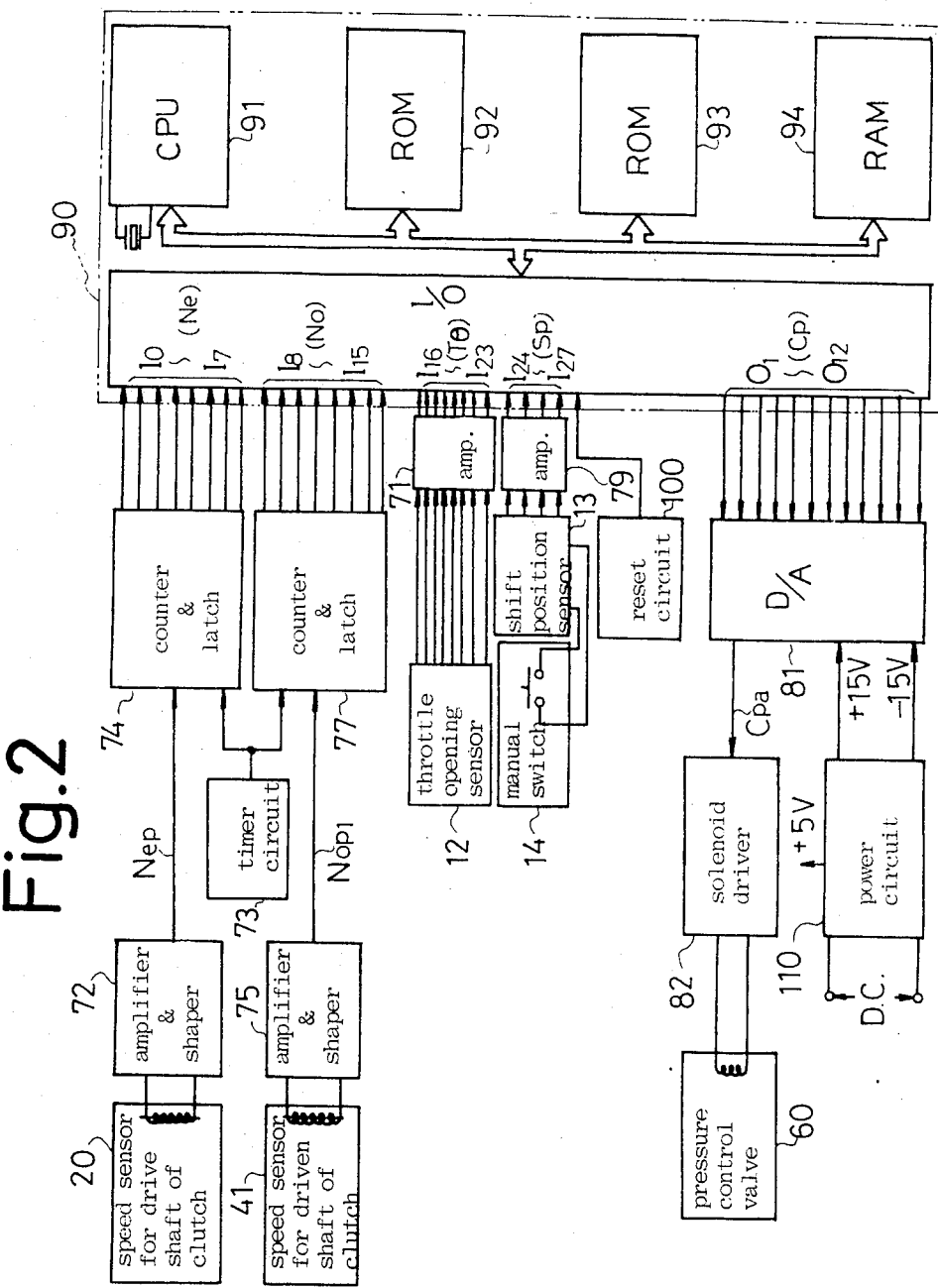
FIG. 2 is a block diagram showing the general arrangement of the embodiment in more detail.

FIG. 2 shows the general arrangement of one embodiment of the invention while FIGS. 3a to 3f show the detail of various parts. First, referring to FIGS. 2 and 3a, a system for detecting the rotational speed of the drive shaft of the clutch will be described. The clutch drive shaft fixedly carries a permanent magnet gear having a plurality of teeth formed along its periphery, with adjacent teeth being magnetized to opposite polarities. A core of a magnetizable material is disposed in opposing relation with the teeth and carries a sensor coil thereon, the assembly forming the rotation sensor 20. As the magnet gear rotates, an alternating voltage is induced in the sensor coil, and is applied to amplifier and waveform shaper circuit 72 of the interface 70. The circuit 72 includes a first operational amplifier OP1 which inverts and amplifies the input alternating voltage, a second operational amplifier OP2 which again inverts, amplifies it and shifts its level, and a first and a second transistor which convert the input into a binary signal, which is then inverted and amplified. As a result of such arrangement, there are produced speed detection pulses of a frequency and a pulse width which depend on the rotational speed of the magnet gear 20, and which are applied to a monostable multivibration MM1. The monostable multivibrator MM1 is triggered by the rising end of the speed detection pulse to produce a pulse output of high level or "1" which has a given short duration. In this manner, the output from the monostable multivibrator MM1 represents a sequence of pulses of a given pulse width and having a frequency which is proportional to the rotational speed of the clutch drive shaft and which is indicative of the engine speed. The sequence of pulses are passed through NAND gate NA1 to be applied to a counter latch 74 of the interface 70, which comprises a pair of four bit counters CO1, CO2, and latch LA1. The sequence of pulses are counted by the counter CO1, and a carry pulse from the counter CO1 is counted by the counter CO2. In this manner, the combination of the counters CO1 and CO2 forms an 8 bit counter. The count in the counters CO1 and CO2 are used to update the content of the latch LA1 at a given time interval, whereupon the counters CO1, CO2 are cleared. Therefore, data stored in the latch LA1 represents a number of engine speed detection pulses obtained during a given period, or the rotational speed of the engine. A timer 73 controls the updating operation of the latch LA1 and the clearing operation of the counters CO1, CO2. In the timer 73, pulses produced by a pulse oscillator OSC are frequency divided by a combination of a counter CO3 and NAND gates NA2 and NA3 to form a latching instruction pulse and a counter clear pulse. The counter clear pulse is converted into a pulse of a reduced width by means of a monostable multivibrator MM2 to clear the content of the counters CO1, CO2 momentarily subsequent to activating or updating the latch LA1.

Figure 3A:
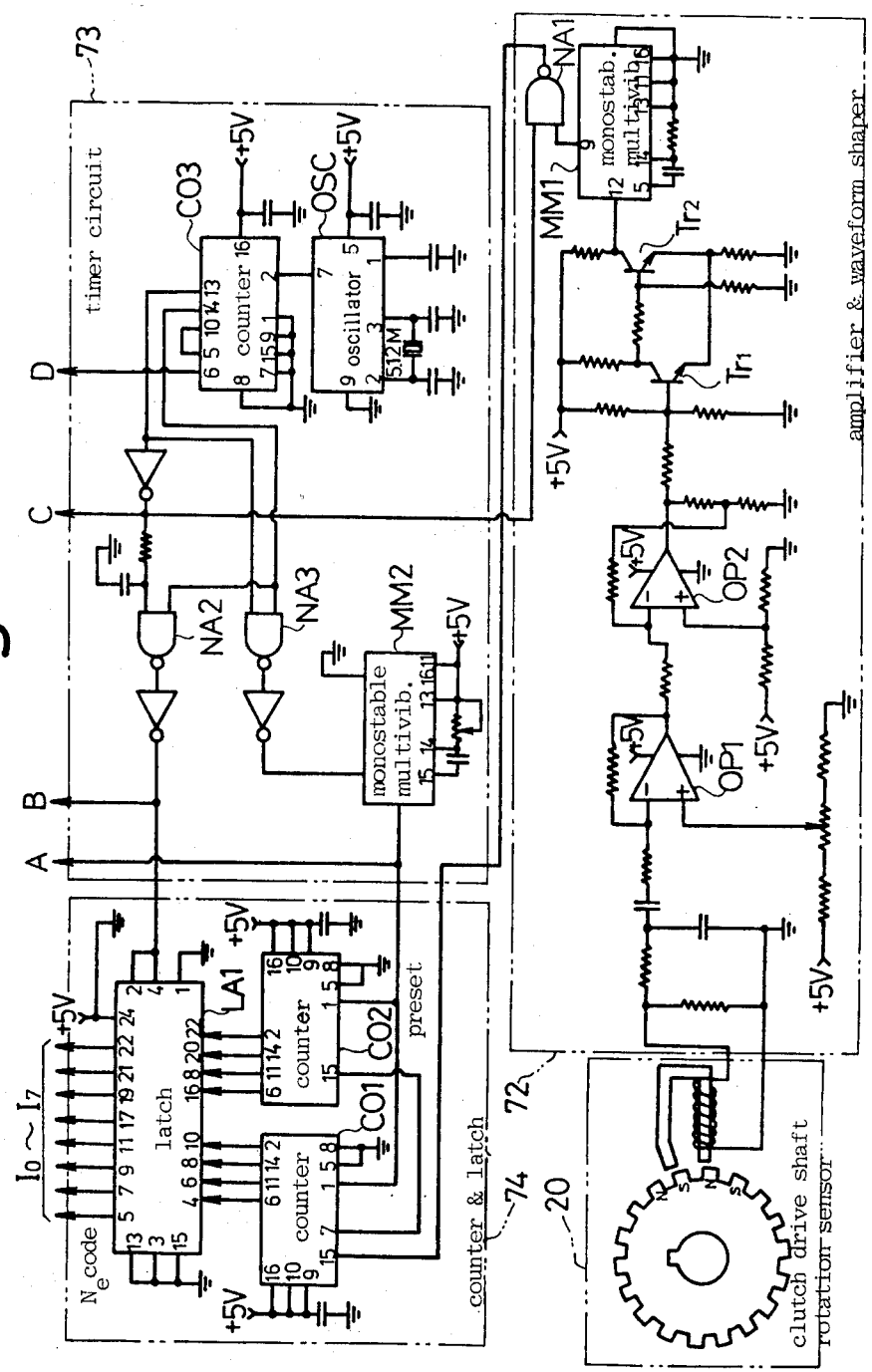
Figure 3B:
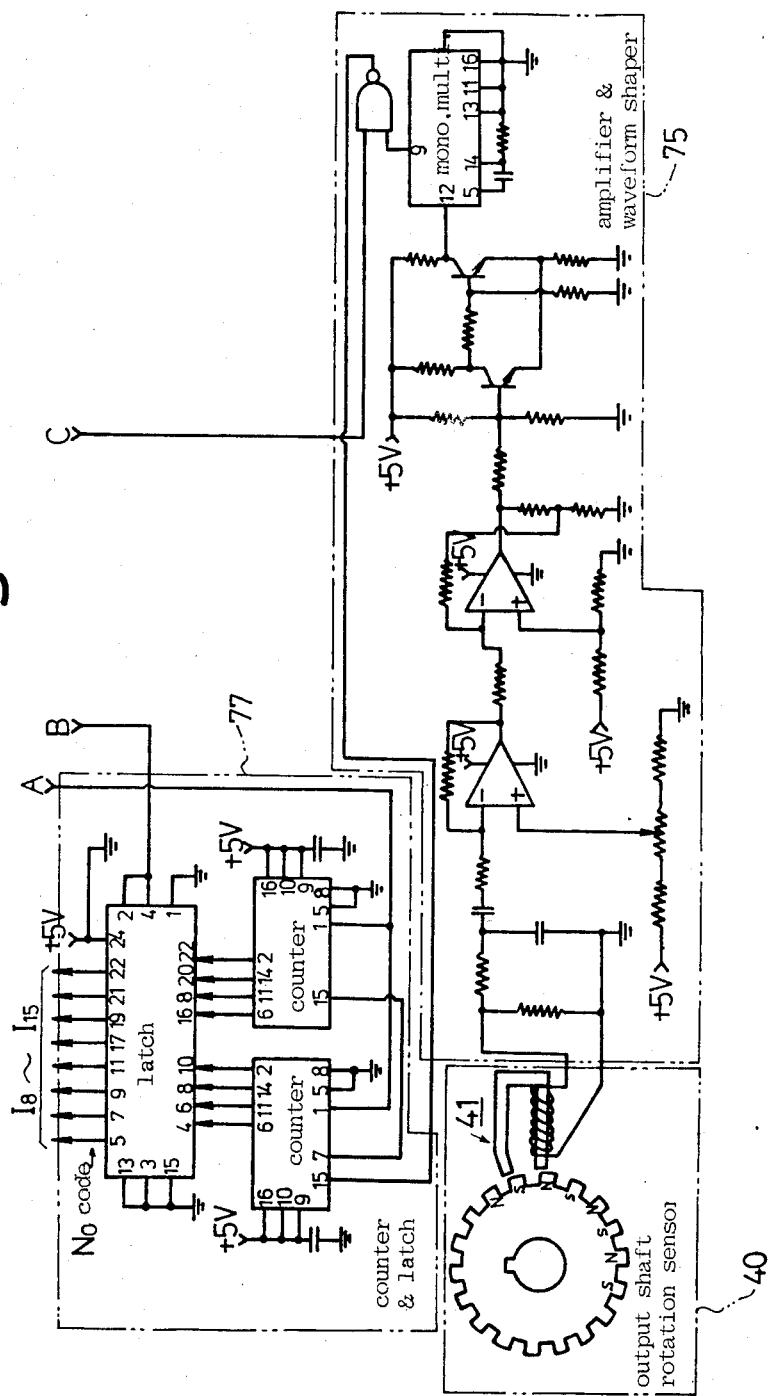

Referring to FIGS. 2 and 3b, a system for detecting the rotational speed of the driven shaft of the clutch as well as a system for detecting the direction of rotation of the driven shaft of the clutch will now be described. The driven shaft of the clutch includes a permanent magnet gear which is similar to that provided in the rotation sensor 20, and also includes core 41 of a magnetizable material carrying a detection coil thereon and which is disposed in opposing relationship with the gear. An induced voltage in a coil is applied to an amplifier and waveform shaper circuit 75. The circuit 75 is arranged in the same manner as the circuit 72 mentioned before. The output pulses from the circuit 75, representing the rotational speed of the driven shaft of the clutch, are applied to a counter and latch circuit 77, which is constructed in the same manner as the counter and latch circuit 74. As before, the circuit 77 receives a latching instruction pulse and a counter clear pulse which are the same as those applied from the timer 73 to the circuit 74. In this manner, data stored in the latch represents the rotational speed of the driven shaft of the clutch.

Figure 3C:
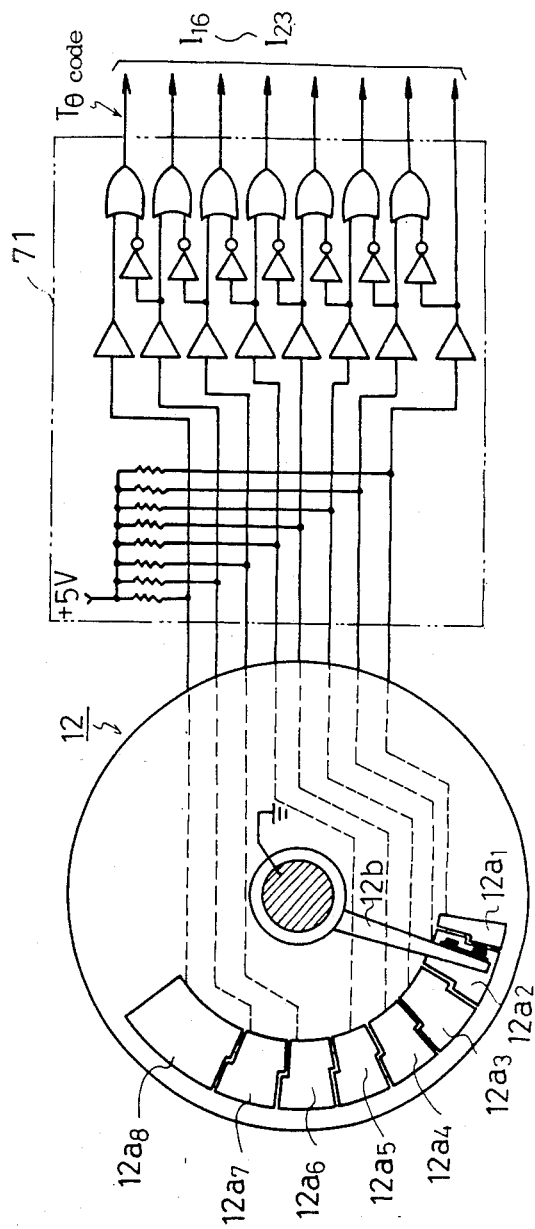

FIG. 3c shows the general construction of the throttle opening sensor 12 and a processing circuit 71, representing a part of the interface 70, which processes a detection signal from the sensor 12. The throttle opening sensor 12 includes a printed substrate on which eight electrodes $12a_1$–$12a_8$ are formed. The sensor 12 includes a rotary shaft connected electrically to the ground and also connected to the rotary shaft of the throttle valve and fixedly carrying a slider electrode 12b having two radially separated brushes. A rotation of the electrode 12b corresponding to an opening from 0% to 100% is limited from the electrodes $12a_1$ to $12a_8$. A relationship between the opening of the throttle valve and output code of the processing circuit 71 is shown in Table 1.

TABLE 1

| Throttle opening θ (%) | Throttle opening abbreviation (%) | Tθ code | | | | | | | |
|---|---|---|---|---|---|---|---|---|---|
| | | $I_{16}$ | $I_{17}$ | $I_{18}$ | $I_{19}$ | $I_{20}$ | $I_{21}$ | $I_{22}$ | $I_{23}$ |
| $0 \leq \theta \leq 2$ | 0 | 1 | 1 | 1 | 1 | 1 | 1 | 1 | 0 |
| $2 < \theta \leq 8$ | 5 | 1 | 1 | 1 | 1 | 1 | 1 | 0 | 1 |
| $8 < \theta \leq 16$ | 10 | 1 | 1 | 1 | 1 | 1 | 0 | 1 | 1 |
| $16 < \theta \leq 24$ | 20 | 1 | 1 | 1 | 1 | 0 | 1 | 1 | 1 |
| $24 < \theta \leq 32$ | 30 | 1 | 1 | 1 | 0 | 1 | 1 | 1 | 1 |
| $32 < \theta \leq 48$ | 40 | 1 | 1 | 0 | 1 | 1 | 1 | 1 | 1 |
| $48 < \theta \leq 56$ | 50 | 1 | 0 | 1 | 1 | 1 | 1 | 1 | 1 |
| $56 < \theta \leq 100$ | 100 | 0 | 1 | 1 | 1 | 1 | 1 | 1 | 1 |

The throttle opening θ is indicated by the throttle opening abbreviation shown in Table 1 hereinafter.

There are gaps between the two of the electrodes $12a_1$ to $12a_8$. However the gaps are creased so as to touch one of the brushes of the slider electrode $12b$ to one of the electrodes $12a_1$ to $12a_8$ when the other of the brushes is on one of the gaps. This prevents that both brushes of the slider $12b$ come off from the electrodes $12a_1$ the $12a_8$ at the same time. As a consequence, two brushes may assume a ground level simultaneously. To enable an opening detection signal to be uniquely defined under such condition, the processing circuit 71 is arranged such that the potential assumed by the electrodes $12a_1$–$12a_8$ is applied, after amplification, to OR gates both directly and through inverters so that a detection signal corresponding to a lower opening is initially outputted.

Referring to FIG. 3d, a D/A converter 81 and solenoid driver 82 which controls the energization of the pressure regulating valve 60 will now be described. The microprocessor unit 90 produces a clutch control signal on its output ports $O_1$–$O_{12}$ where it is latched. The signal appearing on the port $O_1$ represents a reset control signal for the flipflop FF1 (refer to FIG. 3f); and signals appearing on other ports $O_2$–$O_{12}$ represent control signals for the pressure regulating valve 60 or data controlling the energization of the clutch. The solenoid driver 82 receives an analog energization signal from the D/A converter 81, as instructed by the clutch control code (hereafter referred to as Cp code). A transistor Tr6 controls the conduction of another transistor Tr7 in accordance with the level of the analog signal. Accordingly, there occurs a current flow through a solenoid associated with the pressure regulating valve 60, of a level as instructed by the Cp code. The plunger of the valve 60 having a throttle opening remains at the position which corresponds to the energization level of the solenoid.

FIG. 3d also shows a power supply unit 110. As shown, a main battery mounted on the vehicle supplies a d.c. voltage of 12 V, which is stepped down to and maintained at a constant value of 5 V by means of a constant voltage element 111. This voltage is then stepped up to a value of 30 V by a DC/DC converter 112, which has a center tap, located at a voltage level of 15 V, which is connected to the ground, thus supplying ±15 V to the D/A converter 81.

Figure 3E:
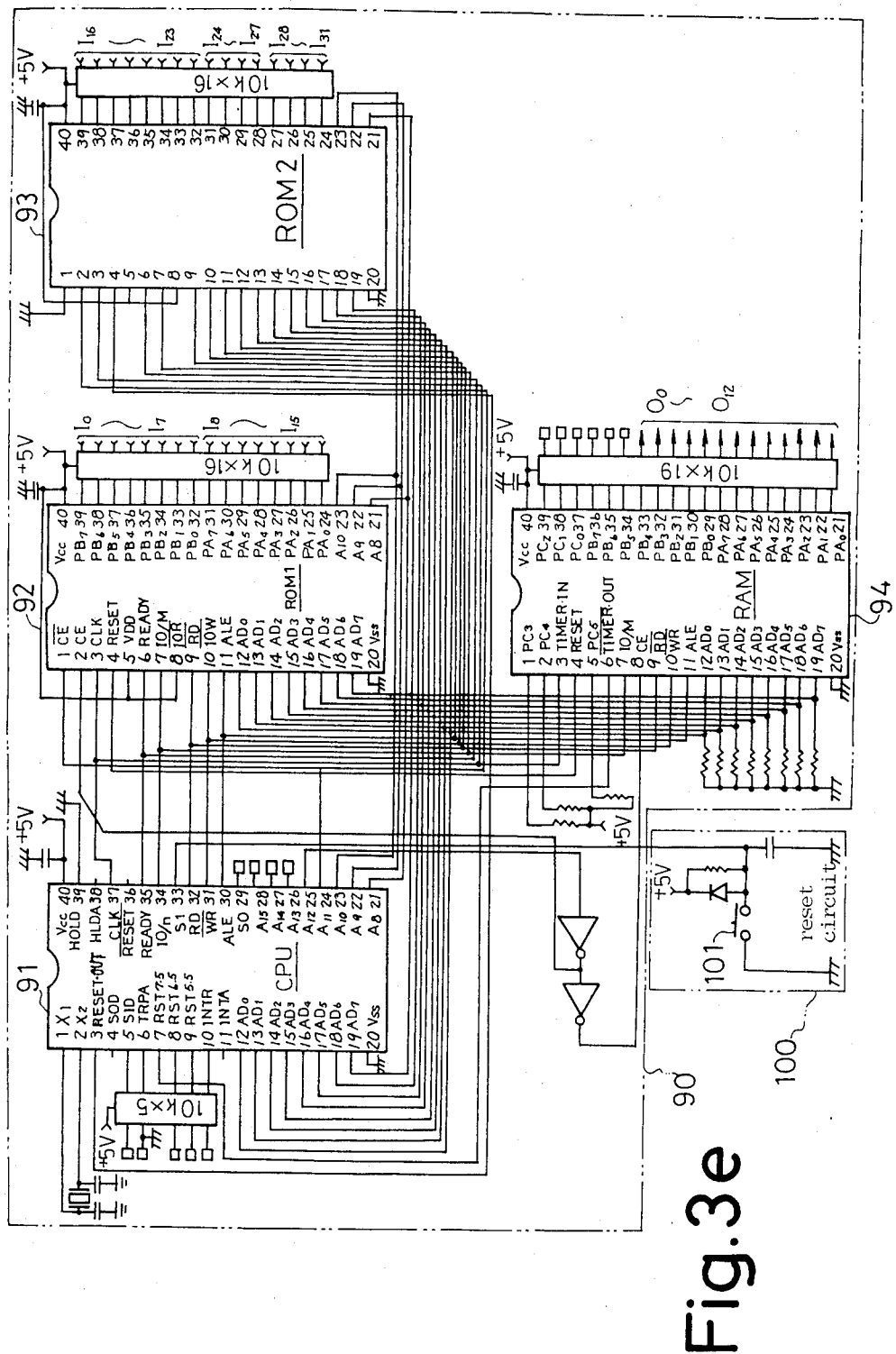

FIG. 3e shows the general arrangement of the microprocessor unit 90. The unit 90 comprises a microprocessor 91 (hereafter referred to as CPU), a pair of semiconductor read only memories 92, 93 (hereafter referred to as ROM1 and ROM2) having input/output ports, and a semiconductor read-write mrmory 94 (hereafter referred to as RAM) having input/output ports. The unit includes a reset circuit 100 to which a voltage of 5 V is supplied. Immediately after the application of the voltage 5 V and thereafter whenever a reset switch 101 is closed, the reset circuit produces a reset signal which is applied to CPU 91. In response to the reset signal, CPU 91 effects an initialization of its input/output ports. An interrupt input terminal INTA of the CPU 91 is connected to the output line of the system 400 shown in FIG. 1 for transmitting the signal which indicates the change of speed stage. Responding to the signal, CPU 91 jumps to an interruption program.

Principal components described above are formed by IC elements, which are specified in Table 2 below.

TABLE 2

| Components | Reference charcter | Manufacturer | Product number |
|---|---|---|---|
| counter | CO1, CO2 | Motorola | MC14029B |
| counter | CO3 | " | MC14518B |
| latch | LA1 | " | MC14508B |
| monostable multivibrator | MM1, MM2 | " | MC14027B |
| monostable multivibrator | MM3 | " | MC14528B |
| direction discriminating element | FF2 | " | MC14027B |
| CPU | 91 | Intel | 8085 |
| ROM | 92, 93 | " | 8755 |
| RAM | 94 | " | 8156 |

Referring to FIG. 3f, the shift lever position detecting arrangement will now be described. A shift lever detector 13 includes four electrodes having a pattern shows by inclined lines in FIG. 3f and formed on a printed substrate, as well as a slider connected to a shift lever and the ground and contacting with one of the electrodes. The electrodes are connected to a processor circuit 79, which includes the flipflop FF1. The manual switch 14 which is used to prolong the temporary clutch activation is connected to the flipflop FF1. The relationship between the position of the shift lever and the status code is indicated in Table 3 below. It is to be noted that the flipflop FF1 is set in response to the closure of the switch 14 and is reset by the microprocessor unit 90.

TABLE 3

| Shift lever position | | Sp code | | | |
|---|---|---|---|---|---|
| | | $I_{24}$ | $I_{25}$ | $I_{26}$ | $I_{27}$ |
| Neutral N | | 1 | 0 | 1 | X |
| Drive | D | 1 | 1 | 0 | X |
| | 2 | 1 | 1 | 0 | X |
| | L | 1 | 1 | 0 | X |
| Reverse R | | 1 | 0 | 0 | X |
| Parking P | | 1 | 0 | 1 | X |
| Manual set switch 14 | Open | X | X | X | 1 |
| | Momentary closure | X | X | X | 0 |

Clutch controlling programs and data for controlling the energization of the clutch are previously stored in ROM 92, 93 of the microprocessor unit 90. Data controlling the energization of the clutch will be generally described first. The data includes data for compensating a delay of clutch response, control data for detecting vehicle load, the first time segment clutch control data groups and the second and subsequent time segment clutch control data groups. The data for compensating the delay of clutch response are read out at an initiation of the clutch coupling for supplying a relatively high pressure to the clutch 30 for a very short time interval (0.15 sec) such that a clutch board of the clutch 30 is driven toward a clutch coupling direction by a play stroke of the board, and comprises two values (Vs3, Vs4), one (Vs3) of which is for the throttle opening under 40% and the other (Vs4) for over 40% (Vs4<Vs3).

The control data for detecting engine (vehicle) load are that for setting a relatively high pressure for a very short time (0.15 sec) for detecting the engine load. The control data includes six groups, each corresponding to the throttle opening $\theta \geq 5\%$ (5%, 10%, 20%, 30%, 40% and more than 50%) and each including m data corresponding to m separations of the rotational speed Ne of the drive shaft of the clutch over 900 rpm. Thus the control data includes mx6 data, each of which is specified or selected by the throttle opening $\theta$ and the rotational speed Ne at the initiation of the engine load detection. The higher the rotational speed Ne, the higher the coupling force of the clutch 30 based on the data selected by the speed Ne, as well as the larger the throttle opening $\theta$, the higher the coupling force of the clutch 30 based on the data selected by the opening $\theta$.

The first time segment clutch control data groups, each having eight clutch pressure indication data, are specified or selected respectively by the vehicle load (dNe/dt) and the throttle opening $\theta$. Whereas the second and subsequent time segment clutch control data groups, each having eight clutch pressure indication data, are specified or selected by the rotational speed No of the driven shaft of the clutch 30 and the throttle opening $\theta$. The data for controlling the energization of the clutch further include data (Vs1) for providing the clutch with a relatively low pressure which will not generate a coupling force and data (Vsml) for providing the clutch with a high locking pressure exceeding a critical pressure (Vsm) for obtaining complete coupling force (e=1).

Figure 4:
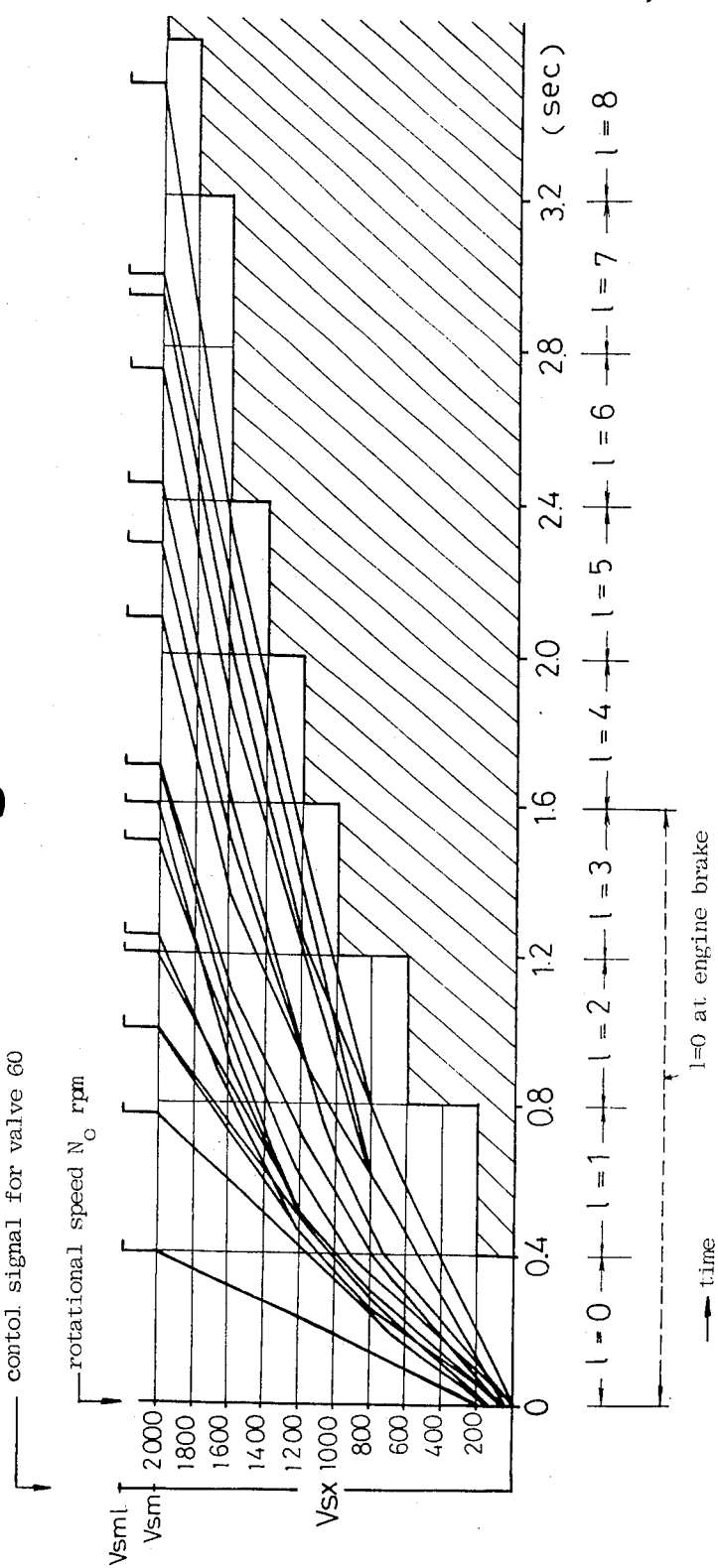
FIG. 4 graphically shows clutch controlling data which is stored in read only memories shown in FIGS. 1 and 2.

FIG. 4 graphically shows the clutch control data groups of the first, the second time segment and subsequent, with reference to the lapse of time from the start of clutch control and the rotational speed No of the driven shaft of the clutch 30. In FIG. 4, the axis of abscissa is divided into segments each having a length of 0.4 sec (l=0 to l=8), each of which is assigned with one group or several groups of clutch energization controlling data. In FIG. 4, the segment l=0 has an asisgnment of ten groups, the segment l=1 has an assignment of fourteen groups, . . . and the segment l=8 has an assignment of a group of clutch energization controlling data. While clutch energization controlling data of each group is shown to assume a continuous value with time t in FIG. 4, it is to be understood that, as indicated by dots for the segment l=0 in FIG. 5a, the interval of 0.4 second is subdivided into eight equal divisions or subintervals each having a length of 0.05 sec. In other words, a single group in each segment (l) includes eight clutch energization controlling data, each of which is read as a time length of 0.05 sec passes. Such clutch energization controlling data is stored in ROM 92 and 93, and a particular group is specified by i=1 to 9, j=1 to 4 and l=0 to 8. K=1 to 8 specifies a particular controlling data within a given group, corresponding to a point on a curve shown in FIGS. 4 and 5a. Upon starting the vehicle, l=0 is chosen, and 1 is incrementally added to increase the magnitude of l after each 0.4 sec interval. Thus, l indicates the lapse of a time interval of 0.4 sec while K is incremented by one for each time length of 0.05 second during a particular value of l, with K=9 returning to K=1. Thus, K indicates the elapse of a subdivision time. The character "i" indicates a load on the engine or vehicle, and upon starting the vehicle (l=0), the load on the vehicle is determined on the basis of a rate of change of the rotational speed of the engine, dNe/dt, when the clutch has just been engaged and the value of i is determined in accordance with the magnitude of the load. However, during l=1 and subsequent segments, the value of i is determined in accordance with the rotational speed No of the driven shaft of the clutch 30. The character "j" indicates an engine power, which is determined on the basis of the throttle opening T$\theta$ which substantially indicates the operation of engine. Thus, from the starting of the vehicle until the clutch is completely engaged, a combination of the 0.4 sec segment l, the load on the vehicle i and the engine power j determines a particular group of clutch energization controlling data, each including eight data which defines the rate of level change (the rate of engagement of the clutch e/dt; t is represented in terms of K units or 0.05 sec) for the particular group.

In each segment shown in FIG. 4, where a curve is branched, the branch is determined by i and j. In FIG. 4, a hatched region represents an extent where a clutch slip rate e does not exist actually upon starting the vehicle. No clutch controlling data is necessary in such region, and hence no corresponding data is stored in ROM 92 and 93. To prevent such region from being inadvertently accessed, a data access program prevents an address within the hatched area in FIG. 4 from being specified. Accordingly, clutch controlling data stored in the ROM 92, 93 is determined by an address having l=0 to 8, i=1 to 9, j=1 to 4 and K=1 to 8 as parameters. Though the number of the parameters is increased, the number of data is not so much.

Considering the clutch controlling data shown in FIG. 4, they include data which are utilized for the purpose of control when starting upon a flat road, upon starting on an up slope, when starting upon a very steep slope, when starting on a down slope, and when applying an engine brake.

Figure 5A:
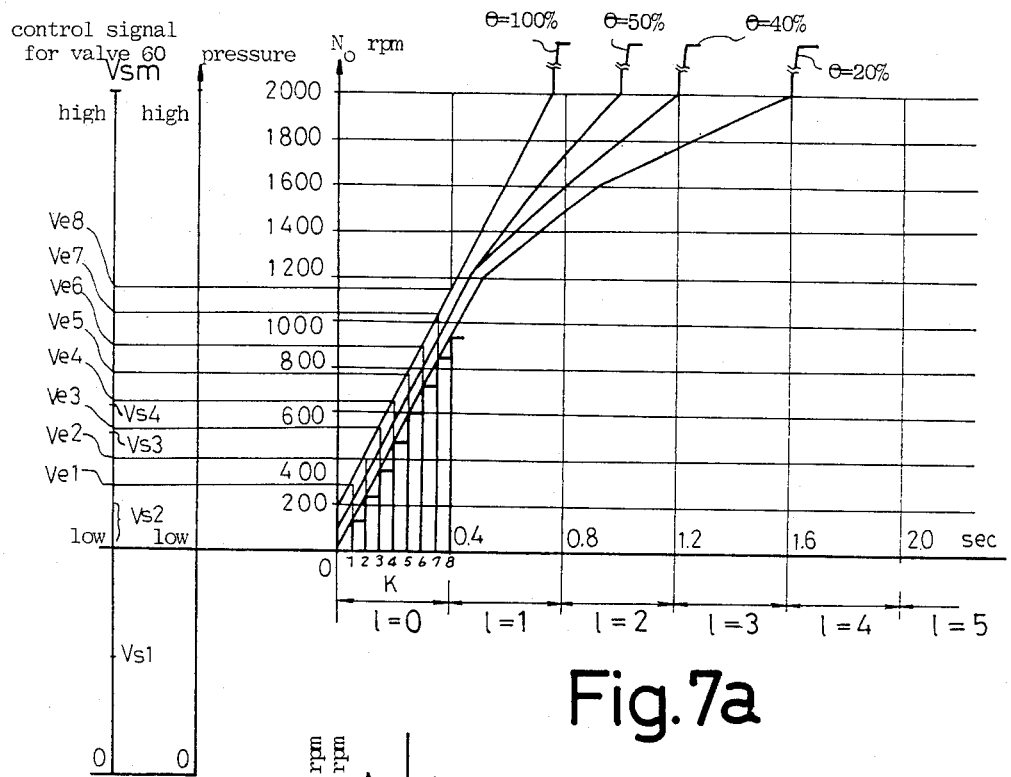
FIGS. 5a, 5b, 5c and 5d graphically show part of the data illustrated in FIG. 4 representing the data used to control a starting on a flat road, a starting on an up slope, a starting on a very steep up slope and to control an engine brake, respectively.
Figure 5B:
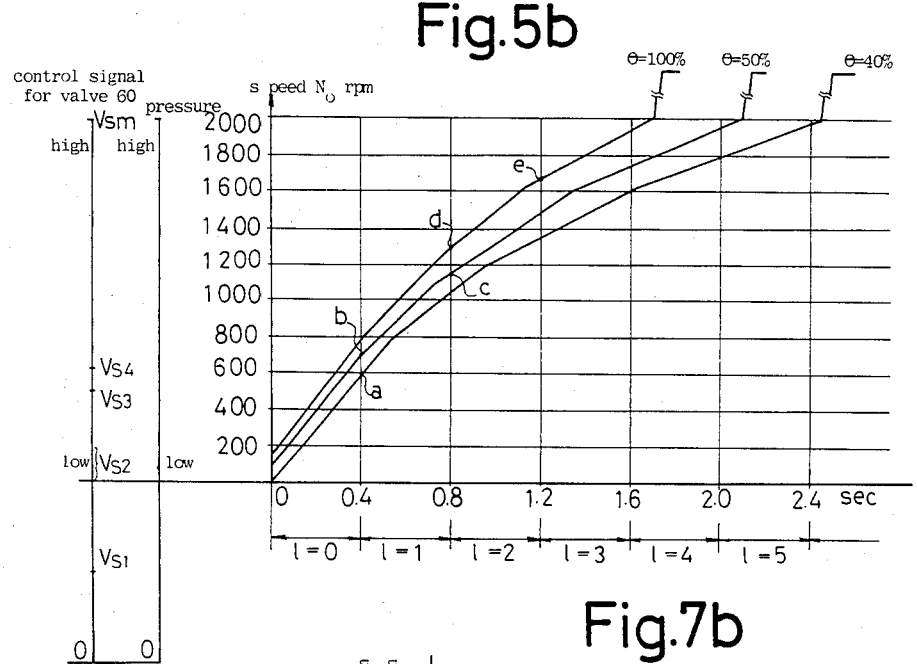
Figure 5C:
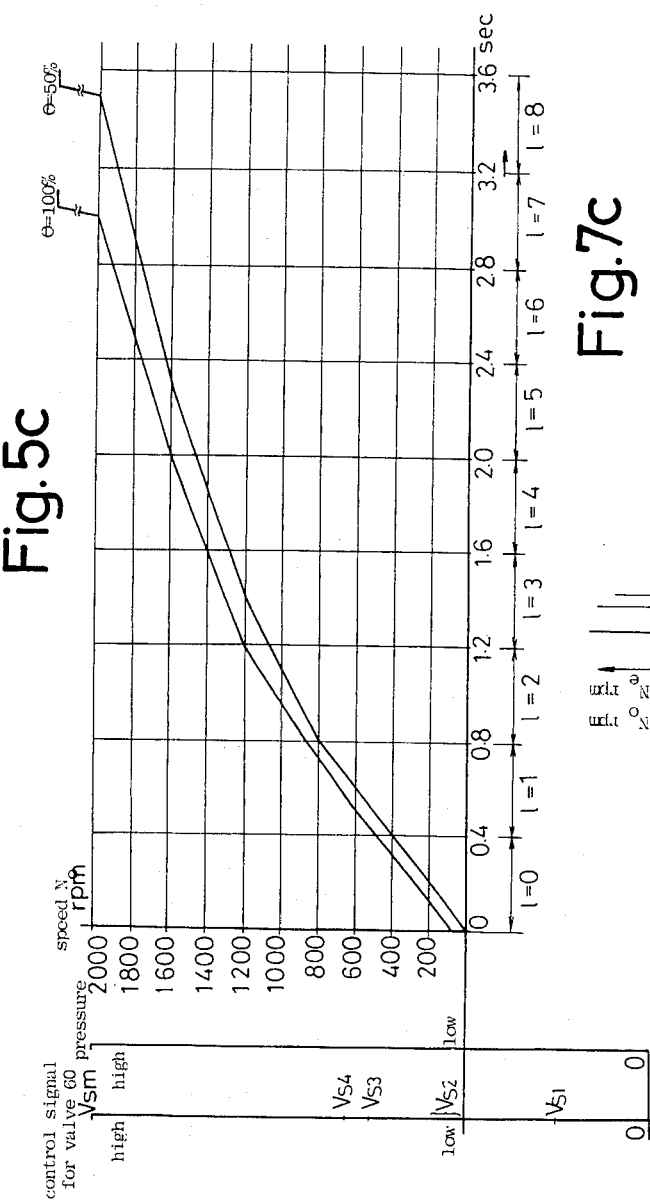
Figure 5D:
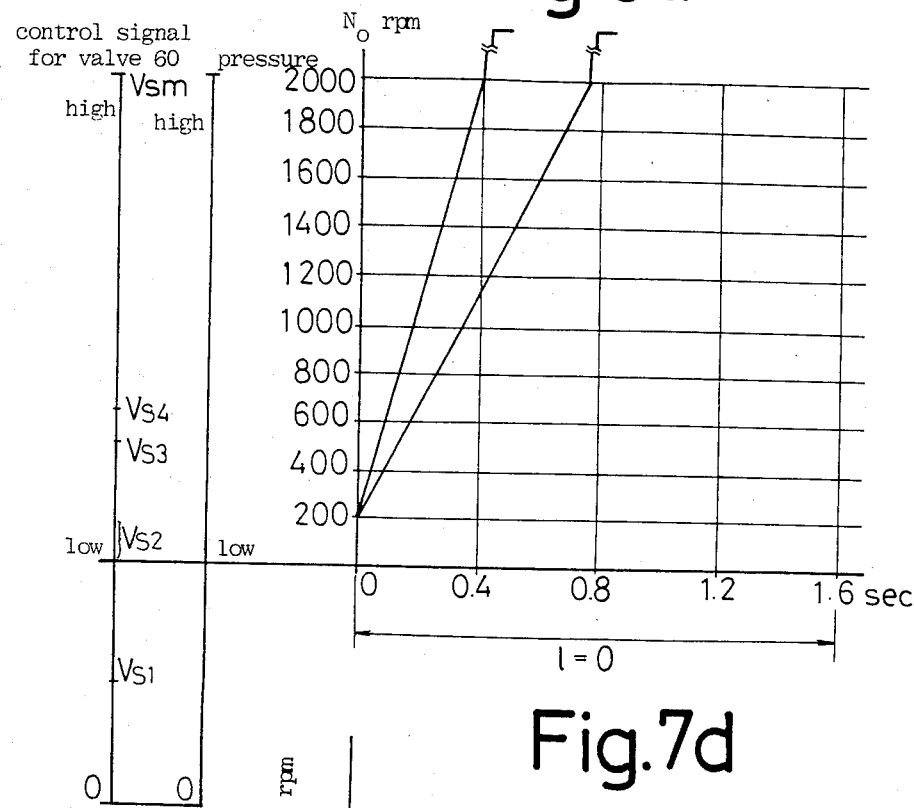

FIG. 5a illustrates several data which may be used when starting on a flat road. As indicated in FIG. 5a, the clutch energization controlling data Vs (a voltage controlling the pressure regulating valve 60) has a reduced magnitude of change rate (dVs/dt) whenever the throttle opening T$\theta$ of j is small, but has a greater change rate if the throttle opening T$\theta$ has a greater value. FIG. 5b illustrates several data which may be used upon starting on an up slope. When running on an up slope, the load imposed upon the vehicle is high, so that the change rate dVs/dt is established at a lower value. FIG. 5c illustrates data utilized when starting on a very steep up slope. In this instance, the load applied to the vehicle is further increased, so that a greatest length of time is established for the slip rate e to change from 0 to 1. Accordingly, the change rate dVs/dt assumes the smallest value. FIG. 5d illustrates data used when starting on a down slope and when applying an engine brake. When starting on a down slope or applying an engine brake, the vehicle drives the engine and hence a greater value is used for the change rate dVs/dt.

ROM 92, 93 store a clutch control program which is used to control the clutch, in addition to the clutch energization controlling data mentioned above.

FIGS. 6a to 6l are flowcharts illustrating clutch control operations performed by the CPU 91 in accordance with the program stored. Referring to these Figures, the operation of the microprocessor unit 90 will be described in detail below.

(1) Initialization—refer to FIGS. 6a, 6b, 6c and 6k

When the power is turned on to CPU 91 and a reset circuit 100, CPU 91 clears its input/output ports and registers then sets them to initial data (control valve 60: closure) in response to the ground level of a capacitor of the circuit 100, the capacitor is the ground level at a short time after the turn on of the power. Also CPU 91 executes the initialization when a reset switch 101 of circuit 100 is closed. Similarly, CPU 91 returns to execute the initialization when the shift lever position is at neutral N or parking P as shown in FIGS. 6a, 6b, 6c and 6k. A coupling pressure is not applied to the clutch 30 at the initialized state because a drain port of control valve 60 is fully opened. Hence CPU 91 returns to the initialization when the shift lever position is neutral N or parking P, and the clutch 30 is automatically released (OFF) when the driver appreciates an abnormal running and changes the shift lever to neutral N or parking P. Even if the system is deviced such that the power is turned on to CPU 91 before the engine is driven to start and CPU 91 receives a fluctuation of the power or noises at the start of the engine, CPU 91 does not run away because the shift lever is at neutral N or parking P at the start of the engine.

Figure 6A:
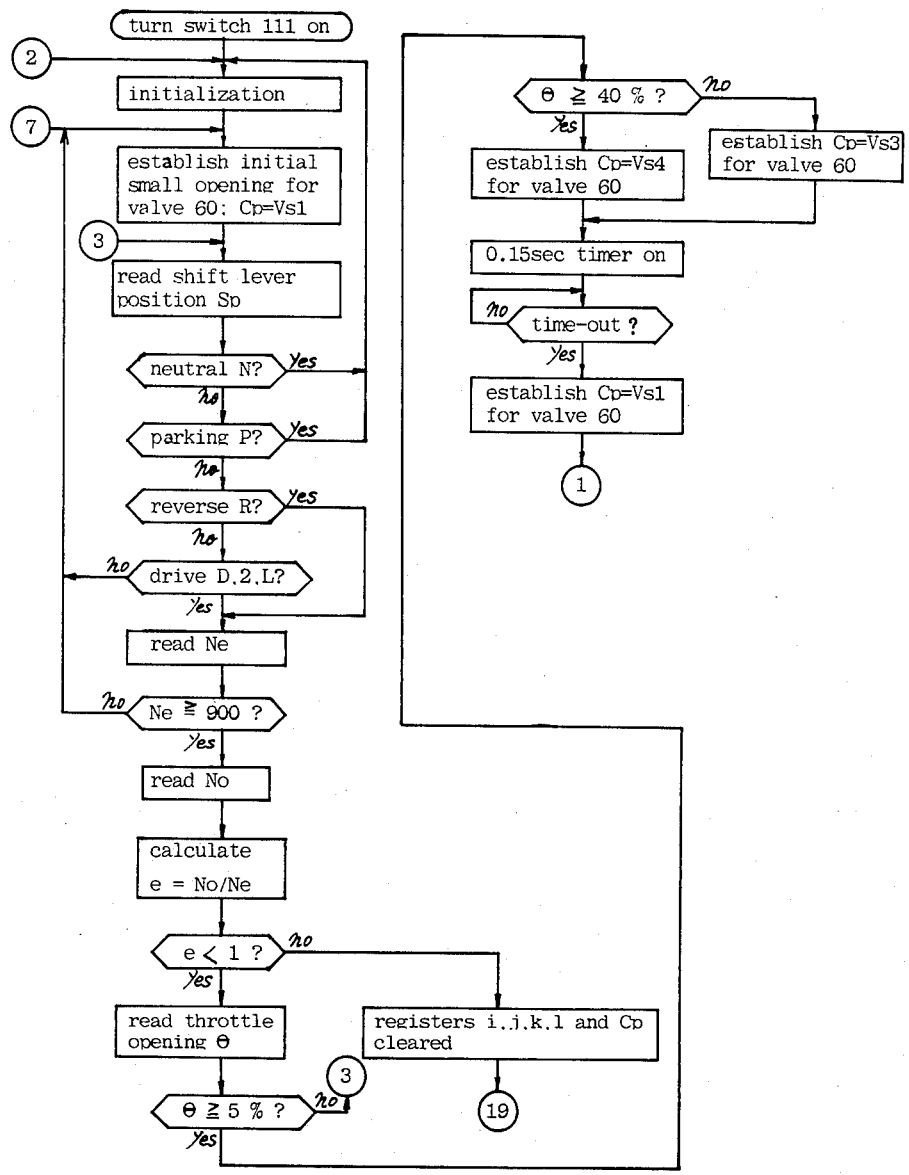

(2) Compensation of the delay of the clutch—refer to FIG. 6a.

CPU 91, after the initialization, sets port to D/A converter 81 to clutch control data Vs1 indicating a slight coupling pressure which cannot provide the clutch 30 with a any substantial coupling. Then CPU 91, reads in the signal Sp output (Sp code of circuit 79) of shift lever position sensor 13. CPU 91 returns to the initialization when Sp indicates neutral N or parking P. When Sp indicates reverse R or drive D, 2 or L, CPU 91, reading in the rotational speed Ne of the drive shaft of clutch 30 (output Ne code of counter & latch 74), reads the rotational speed No of the driven shaft of clutch 30 (output No code of counter & latch 77) when Ne≧900 rpm (vehicle start able) or reads the shift lever position (Sp code) when Ne<900 rpm (vehicle start unable).

In the latter case, CPU 91 waits until Ne exceeds 900 rpm. In the former case, CPU 91 calculates the clutch slip rate e=No/Ne, clears registers i through l and Cp (output ports $O_1$ to $O_{12}$) and enters in the high speed clutch on control (engine braking mode) shown in FIGS. 6j, 6k and 6l when e≧1, or reads the throttle opening $\theta$ (output T$\theta$ code of circuit 71) when e<1. In the latter case, CPU 91 returns to reading in the shift lever position Sp through a flow line ③ when $\theta$<5% (engine idling) and waits until $\theta$ exceeds 5%. In the former case, CPU 91 enters in a delay compensation control, wherein CPU 91 sets clutch control ports $O_1$ to $O_{12}$ Vs4 which indicates relatively high pressure when $\theta$≧40% (large opening) because $\theta$≧40% indicates that relatively high acceleration or high power starting is instructed, or CPU 91 sets Vs 3 which indicates relatively low pressure when $\theta$<40%. Vs3 and Vs4 are shown at the ordinate in FIGS. 5a through 5d. CPU 91, outputting Vs3 or Vs4, sets a 0.15 sec timer (programed timer) and waits for time over of 0.15 sec. Then CPU 91 sets output ports $O_1$ to $O_{12}$ the data Vs1 (Cp=Vs1) to release clutch coupling pressure. The application of clutch coupling pressure corresponding to Vs3 or Vs4 for 0.15 sec causes a movement of a coupling board of clutch 30 toward a clutch connection, however the board stops before the clutch connection. At this state, clutch 30 will start the clutch connection instantaneously when an additional pressure exceeding Vs1 will be supplied.

Figure 6B:
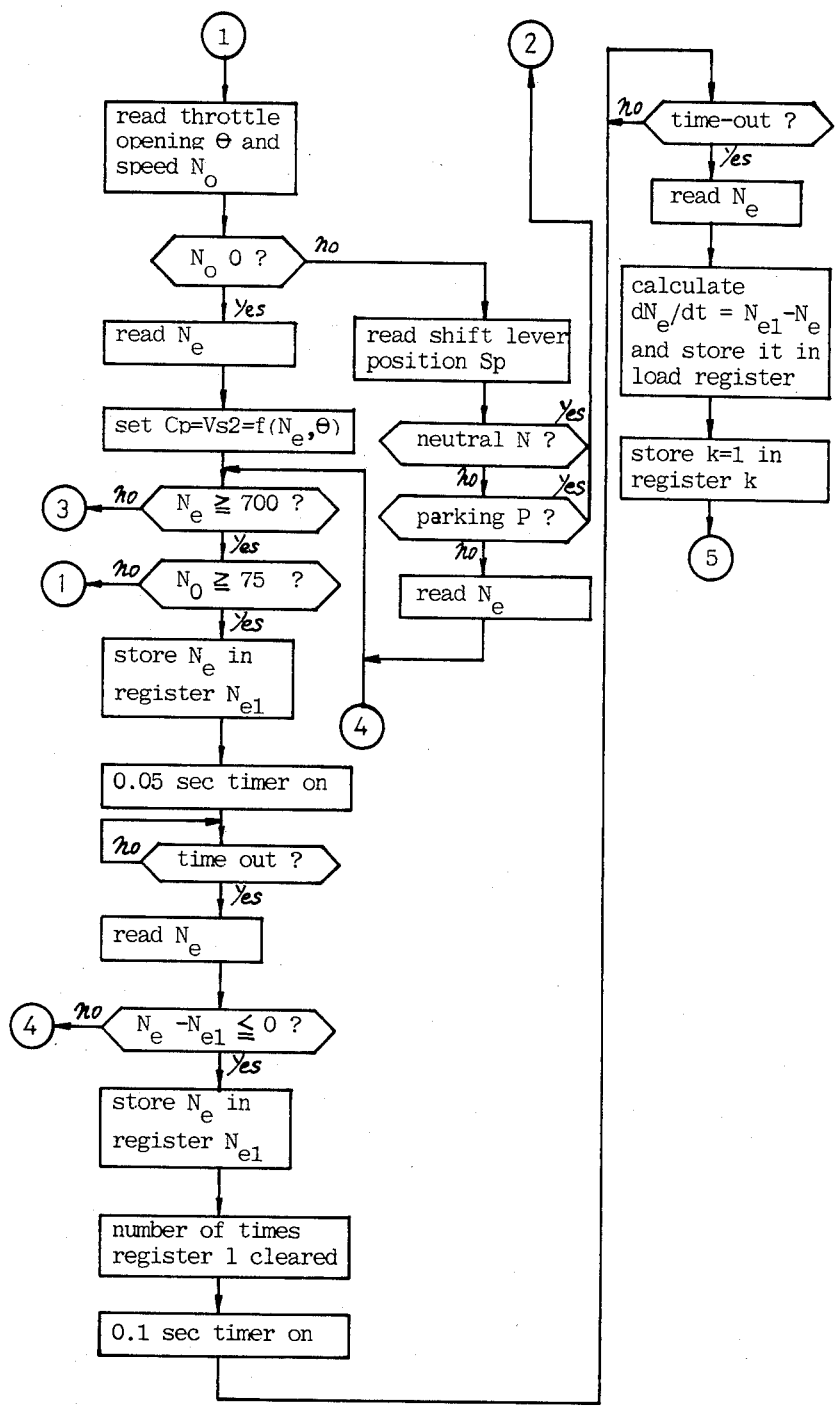

(3) Detection of engine load—Refer to FIG. 6b

After the delay compensation control, CPU 91 reads in the throttle opening $\theta$ (T$\theta$) and the rotational speed No of the driven shaft of clutch 30. When No exceeds 0 (vehicle already started), CPU 91 reading the shift lever position for maintaining safety, returns to the initialization when the position is neutral N or parking P or reads in the rotational speed Ne of the drive shaft of clutch 30 when the position is other than N, P.

When No=0, CPU 91 reading in Ne, reading out a clutch control data Vs2 for vehicle load detection by accessing with Ne and $\theta$ and output the clutch control data Vs2 to output ports $O_1 \sim O_{12}$ (Cp=Vs2=f(Ne, $\theta$)). Then CPU 91 advances to the detection of vehicle load when Ne≧700 rpm and No≧75 rpm (load detection able). When Ne<700 rpm or No<75 rpm, CPU 91 returns to a flow line ① directly (when No<75 rpm) or through the flow line ③ (when Ne<700 rpm) for reading in the throttle opening $\theta$ and the rotational speed Ne so as to reset Cp=Vs2=f(Ne, $\theta$). Namely CPU 91 waits for No≧75 rpm. The rotational speed No rises up in response to an increasement of the coupling pressure corresponding Vs2, which is determined by the throttle opening $\theta$ and the rotational speed Ne. CPU 91 reads the shift lever position Sp until No≧75 rpm.

According to the setting of Cp−Vs2=f (Ne, $\theta$), the clutch ON starts with a pressure which corresponds to the throttle opening $\theta$ (driver's intention) and the rotational speed Ne (operating condition of the engine). When $\theta$ and/or Ne is unfit for the vehicle load detection, or start of running, CPU 91 waits for increase of $\theta$ and/or Ne, so that when the driver steps down an accelerator pedal until the vehicle starts running, the vehicle starts smoothly.

The vehicle will start without engine stop when Ne≧700 rpm and No≧75 rpm and also a reduction of the rotational speed Ne corresponding to the vehicle load will appear when No≧75 rpm, CPU 91, after Ne≧700 rpm and No≧75 rpm, storing Ne in register Ne1 and setting a 0.05 sec timer (programmed timer), waits for time-over of 0.05 sec. It then reads the rotational speed of the engine Ne, and makes a decision to see if Ne−Ne1≧0, by comparing the current value of Ne with a value Ne1 in register Ne1. In other words, it waits for a reduction in the engine speed Ne in response to the application of the signal Vs2. If a reduction in the engine speed Ne occurs, it determines that a slight engagement of the clutch has occurred or the engagement of the clutch has been initiated. The CPU 91 then stores the prevailing Ne code in a register Ne1 or updates the engine speed. After 0.05 second, it reads the Ne code again in order to calculate the change rate of the engine speed dNe/dt=Ne1−Ne. The rate dNe/dt has an increased value when the load on the vehicle is high (or when the weight of the vehicle is high and when running on a up slope), and has a low value when the load is low. When Ne exceeds Ne1 (Ne−Ne1≦0? NO), returns to a flow line ④ for waiting Ne−Ne1≦0.

Figure 7A:
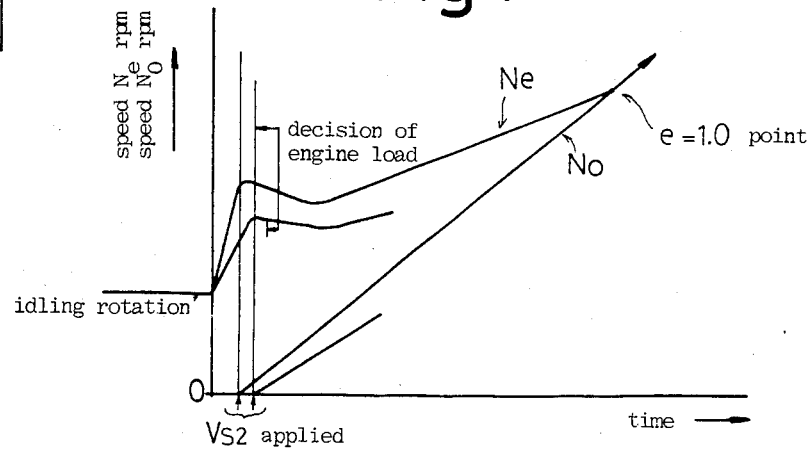
FIGS. 7a, 7b and 7c graphically show a change in the rotational speed Ne of the engine when starting on a flat road, on an up slope and on a very steep up slope, respectively.
Figure 7B:
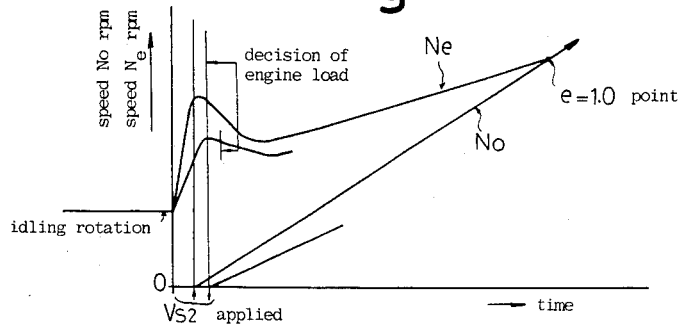
Figure 7C:
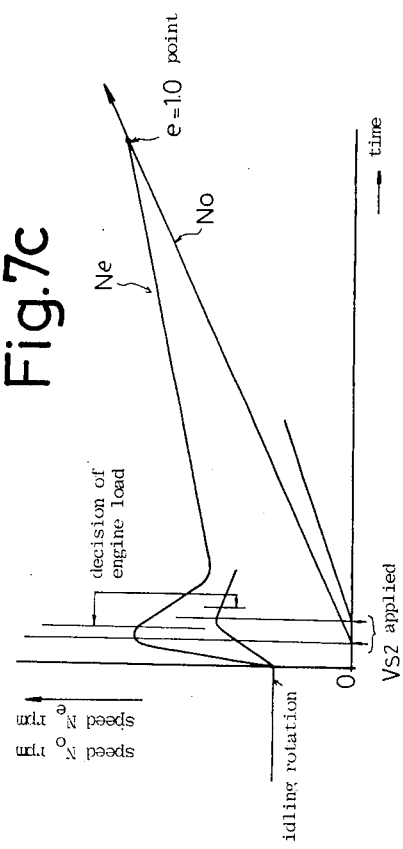
Figure 7D:
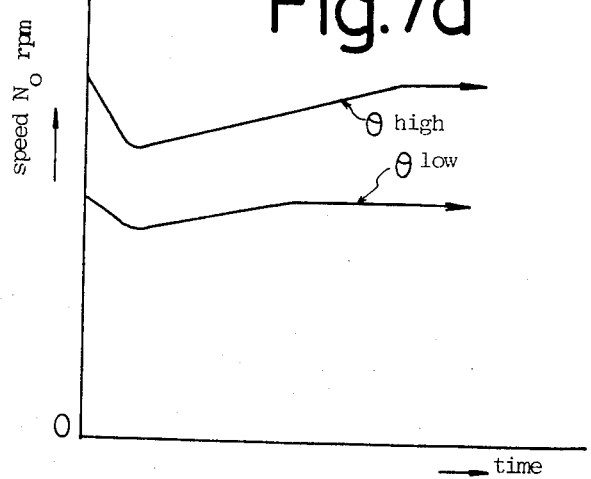
FIG. 7d graphically shows a change in the rotational speed No of the driven shaft of the clutch during an engine brake control.

The relationship between the timing of determining the load and the behaviour of No, Ne is illustrated in FIGS. 7a, 7b, and 7d. FIG. 7a illustrates the relationship when starting on a flat road, FIG. 7b when starting on an up slope and FIG. 7c when starting on a very steep up slope. FIG. 7d graphically shows a change in the speed No of the driven shaft of the clutch during an engine brake mode, to be described later, when the vehicle is running. It is to be noted that the clutch ON control is based on the flow shown in FIGS. 6j, 6k and 6l for the engine brake mode and a down slope starting mode and CPU 91 does not enter to the vehicle load detection.

Figure 6C:
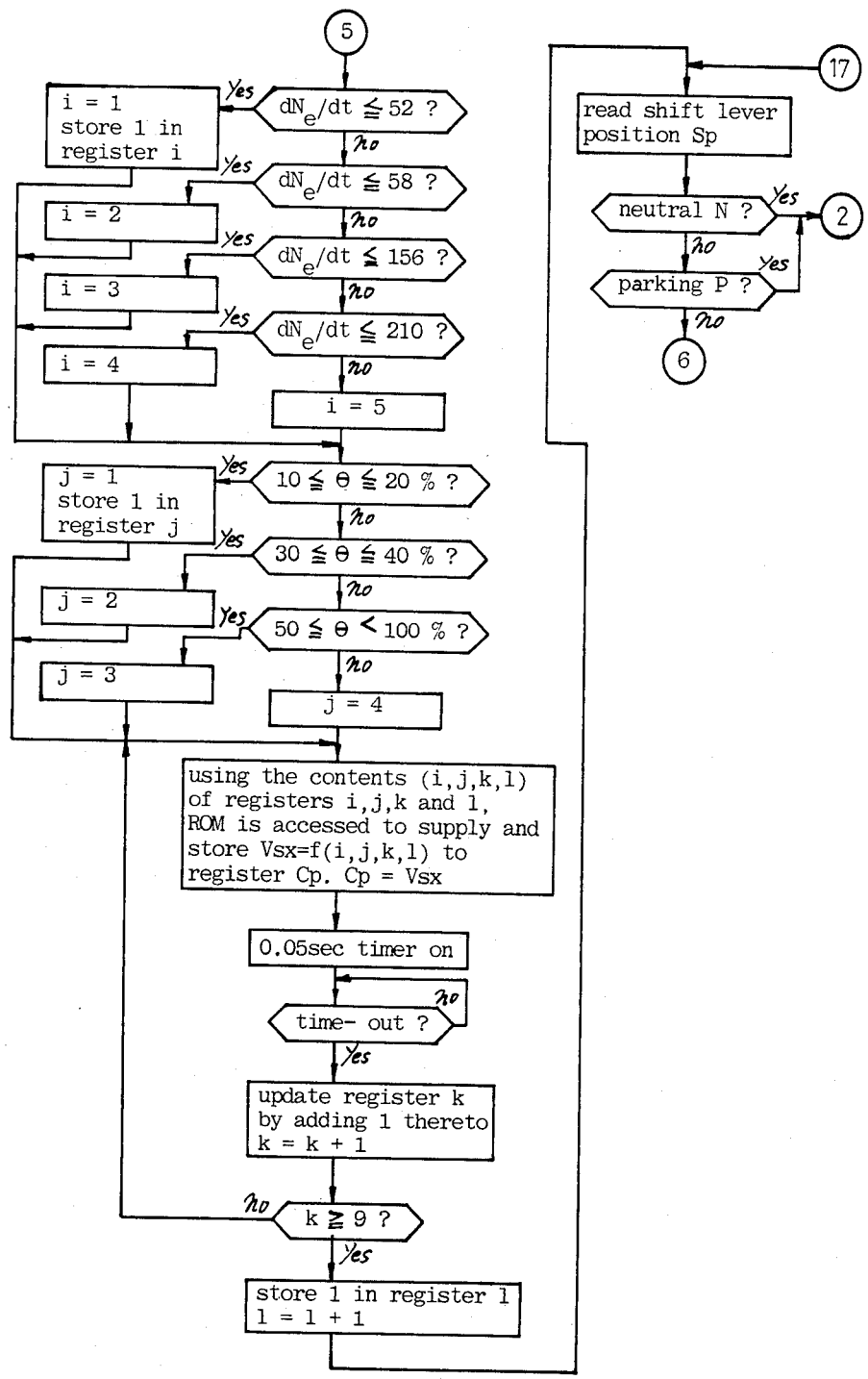

(4) Selection of a data group from the first time segment data groups and clutch control based on the data group—refer to FIG. 6c In the control of aforesaid (3), count 1 is entered into a register K which specifies a particular subinterval address to provide a clutch control during the first segment l=0 (where l represents the content of a register l), thus specifying the first data of this segment. Then CPU 91 stores i in a register i in accordance with the load on the vehicle dNe/dt previously caculated. The CPU 91 reads T$\theta$ code, and stores an engine power representing code j (which represents the content of a register j) into the register j in accordance with the T$\theta$ code or the engine power. At this point in time, it will be seen that a code specifying the first segment l=0 is stored in the register l, a code specifying the first data K=1 is stored in the register K, a code representing the vehicle load i is stored in the register i, and a code representing the engine power j is stored in the register j, respectively.

The CPU 91 then reads out data from the registers i, j, K and l to make up an address to read out a first clutch controlling data (K=1) of a particular group specified by the values of i and j from either ROM 92 or 93, it being recalled that a single group includes eight clutch energization controlling data. The data read out Vsx is stored in an output register Cp, and is also outputted on the output ports O$_1$ to O$_{12}$. Consequently, the energization level of the solenoid associated with the pressure regulating valve 60 is increased so as to correspond to the magnitude of Vsx, and the opening of the valve 60 also increases, thus increasing the pressure with which the clutch 30 is engaged and also increasing the slip rate e. When a time interval of 0.05 sec passes subsequently, the CPU 91 then increments the content of the register K by one to access either ROM 92 or 93 in terms of the parameters i, j, K and l, thus reading out a next following clutch controlling data Vsx. The data read out is stored in the register Cp and is also outputted on the output ports O$_1$ to O$_{12}$. Assuming that the read out data at k=1 is Ve1 (Vsx=Ve1) shown in FIG. 5a, output data for the output ports O$_1$ to O$_{12}$ is changed in turn such as Ve1, Ve2, Ve3, ... Ve8 with the period of 0.05 sec. Ve1 through Ve8 consist a data group which is specified by i (engine load dNe/dt), j (throttle opening $\theta$) and l (l=0: the first time segment). Each one of Ve1 through Ve8 is specified by k.

When the content of the register K reaches 9, the content of the register l is changed to l=1. This completes the clutch control for the first segment l=0. CPU 91 then reading the shift lever position Sp, returns to the initialization when the position is neutral N or parking P otherwise enters into the second time segment clutch control.

Figure 6D:
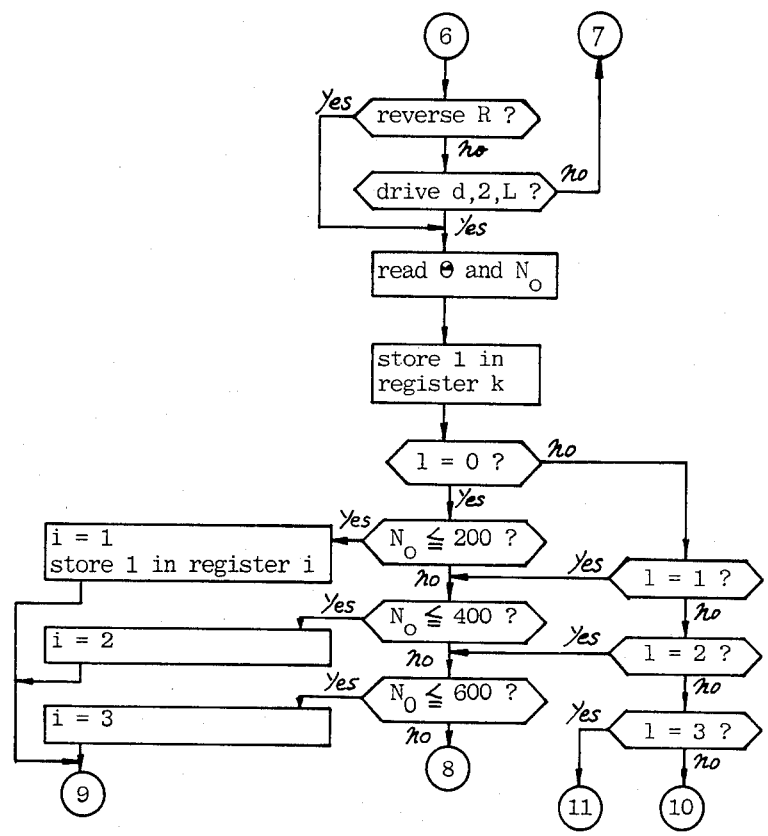
Figure 6E:
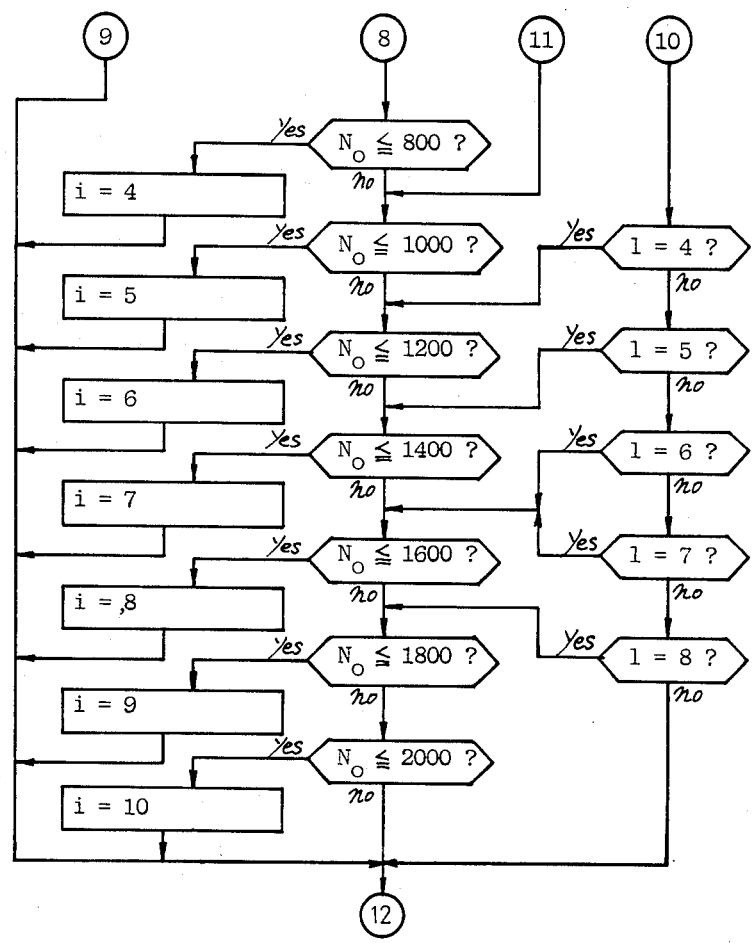
Figure 6F:
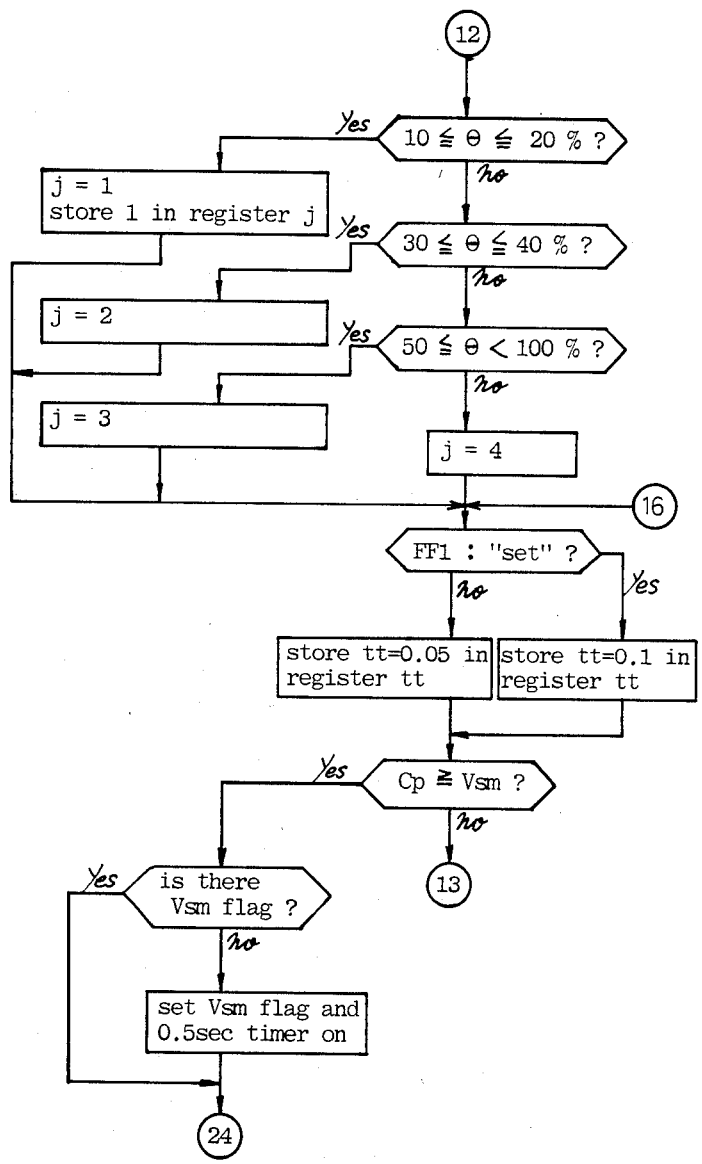
Figure 6K:
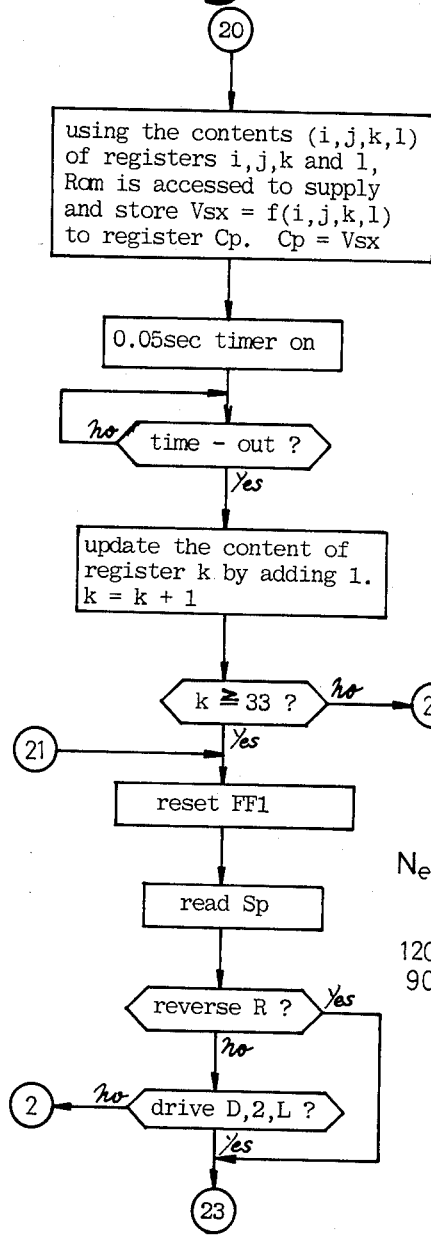
Figure 6L:
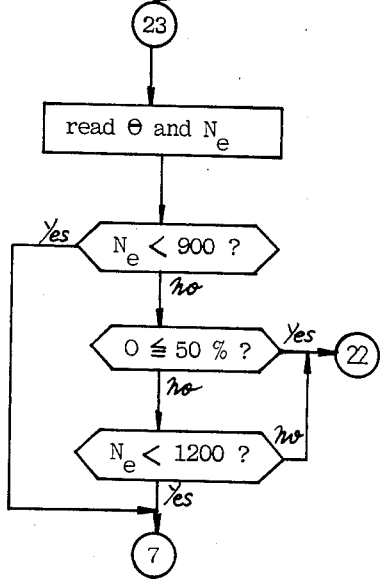

(5) Clutch ON control for the second and subsequent time segments (5)-(A) Selection of a data group—refer to FIGS. 6d, 6e and 6f When the shift lever position Sp is reverse R or drive D, 2, L, CPU 91 reads in the throttle opening $\theta$ and the speed No then resetting the register k to k=1, stores in register i a predetermined value corresponding to l and No and in register j a predetermined value corresponding to $\theta$. The second and subsequent time segment data group will be selected by the content i (speed No) in register i, j (throttle opening $\theta$) in register j and l (lapse of time) in register l.

Figure 8C:
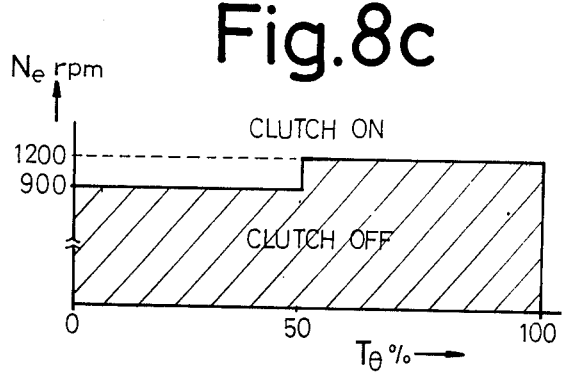
FIG. 8c graphically shows regions where the engine brake can be applied and cannot be applied.
Figure 8A:
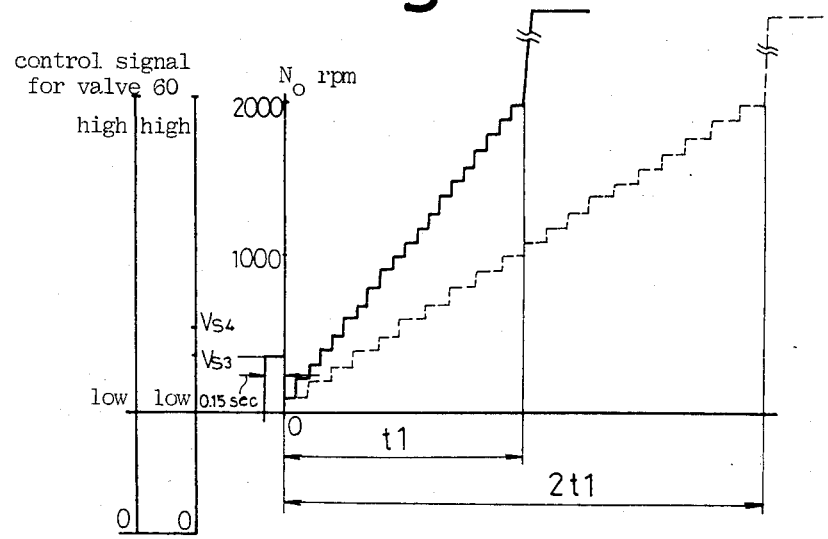
FIG. 8a graphically shows the clutch turn-on response during a manual temporary clutch activation.

(5)-B Half clutch control—refer to FIGS. 6f and 8a

After the renewal of the parameters i, j and k, CPU 91 referring the output of flipflop FFL (I$_{27}$ of output Sp of circuit 79), CPU 91 stores 0.1 sec in a register tt if I$_{27}$ is equal to "1" which indicates "half clutch" or stores 0.05 sec if I$_{27}$ is equal to "0". As a result, whenever I$_{27}$ is equal to "1", the value of K is incremented for each interval of 0.1 sec. In other words, a single segment (l=1, l=2, ...) encompasses 0.8 sec. When I$_{27}$ is equal to "0", the value of tt is chosen to be 0.05 sec, and hence the value of K is incremented for each subinterval of 0.05 sec so that a single segment corresponds to 0.4 sec. Consequently, whenever I$_{27}$ is equal to "0", the slip rate of 1 (Vsm) is achieved within a time interval of t$_1$ as shown by a solid line in FIG. 8a while whenever I$_{27}$ is equal to "1", the slip rate of 1 (Vsm) is achieved within a time interval of 2t$_1$, doubling the temporary clutch activated time. Hence, when the traffic on the road is congested to result in a reduced spacing between adjacent vehicles, the driver may start after temporarily closing the manual switch 14. The flipflop FF1 which produces I$_{27}$="1" is reset in the engine brake control or the down slope starting after once achieving e=1 (Vsm) for the clutch. This resetting operation takes place by CPU 91 applying "0" output on the output port O$_1$. Accordingly, the clutch ON control having an increased length of temporary clutch activation takes place after momentary closure of the manual switch 14 until the engine brake is applied or until the vehicle has get out of the congested traffic condition and is accelerated and subsequently decelerated by the engine brake.

(5)-C Skip of reading out ROM after output of a complete clutch coupling data Vsm—refer to FIG. 6f The largest value of the data stored in ROM for the first, second and subsequent time segments clutch control is Vsm which applies the clutch 30 a relatively low pressure for providing the clutch with the slip rate e=1. After setting and outputting Vsm to output ports O$_1$ to O$_{12}$, it is not necessary to read out the data from ROM. Therefore, CPU 91 reads the output data Cp at output ports O$_1$ to O$_{12}$ and proceeds to flow line ⑬ if Cp is less than Vsm. If Cp$\geq$Vsm, CPU 91 sets a flag and a 0.5 sec timer then skips the reading out of ROM to proceed to flow line ㉔ in FIG. 6h.

(5)-D Complete clutch coupling lock—refer to FIGS. 6h and 6i

After the set of the flag indicating Cp$\geq$Vsm and the 0.5 sec timer, CPU 91 returns via transmission control path ㉔) shown in FIG. 6h and then reads No and Ne and calculates actual slip rate e=No/Ne. When actual slip rate e$\geq$1, CPU 91 sets the output ports O$_1$ to O$_{12}$ Vsml (Cp=Vsml) which provides clutch 30 with the highest pressure shown in FIG. 4.

Figure 8B:
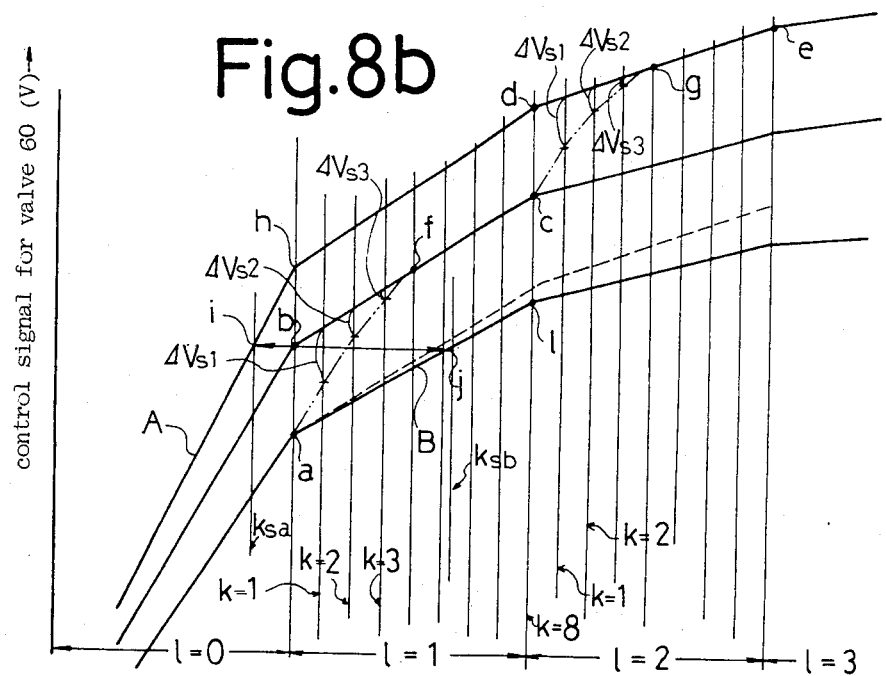
FIG. 8b graphically shows a clutch turn-on characteristic in response to a change in the vehicle loading and the throttle opening during a temporary clutch activation.

(5)-E Pressure gap compensation at the renewal of the time segment data groups—refer to FIGS. 6g, 5b and 8b When Cp$\geq$Vsm? is "NO" in FIG. 6f and CPU 91 proceeds to the flow line ⑬ , it reads out a data Vsx of the second or subsequent time segment data groups from ROM by addressing it with i, j, k and l then sets the data Vsx at the output ports $O_1$ to $O_{12}$. There may occur a break a continuity of the clutch control pressure by the data Vsx at k=1. For example, assuming that the pressure of the clutch 30 is controlled to rise up to a point "a" during l=0 as shown in FIG. 5b and another point "b" is selected by i, j, k and l at the initiation of l=1 (this occurs when θ or load i changes during l=0), the pressure of the clutch 30 should rise rapidly from point "a" to "b". Also, the pressure of the clutch 30 might be rapidly changed from "c" to "d" at the initiation of the third time segment (l=2) if the throttle opening θ should increased during the second time segment (l=1). To prevent these abrupt change of the pressure, CPU 91 calculates the difference (Vsx−Cp; e.g. b−a) between Vsx (newly read out data for l=1, k=1) and Cp (output data of l=0, k=8) at the initiation (k=1) of the second and subsequent time segments then divides the difference (Vsx−Cp) into ΔVs1 (k=1), ΔVs2 (k=2), ... ΔVs8 (k=8) wherein $$\sum_{i=1}^{8} \Delta Vsi \approx Vsx - Cp$$

and stores them. Thereafter CPU 91 reads out each data Vsk of time segment l=1 groups and ΔVsk in turn with the period in register tt (0.05 or 0.1 sec), incrementing k, and calculates Vsk−ΔVsk then sets it to output ports $O_1$ to $O_{12}$ (Cp=Vsk−ΔVsk). This operation will be described hereinafter with reference to FIG. 8b which shows an enlarged part of FIG. 5b.

Assuming that CPU 1 reads out the data Vsb indicating "b" at the initiation of the second time segment l=1 and output of ports $O_1$ to $O_{12}$ is the data Vsa indicating "a", CPU 91 calculates Vsb−Vsa and divides it into ΔVs1, ΔVs2 and ΔVs3 (Vsb−Vas=ΔVs1+ΔVs2+ΔVs3) then stores them. Thereafter CPU 91 at first calculates Vsb−ΔVs1 and sets it to ports $O_1$ to $O_{12}$ (Cp=Vsb−ΔVs1). After the duration of time (0.05 or 0.1 sec) indicated by the content of register tt, CPU 91 resets k=2 then reads out a next data Vsx with the parameters i, j, k and l then calculates and sets Vsx−ΔVs2 to ports $O_1$ to $O_{12}$ (Cp=Vsx−ΔVs2). Similarly CPU 91 sets Vsx−ΔVs3 when k=3 (Cp=Vsx−ΔVs3). However CPU 91 sets read out data Vsx when k ≧4. Thus the output data Cp for controlling the pressure of clutch 30 is renewed such as a-f-c-g-e shown in FIG. 8b. This prevents abrupt change of the pressure in clutch 30 thus the shock of vehicle is prevented. When k=9, CPU 91 resetting k=1, l=2 and reading θ and Ne, CPU 91 similarly controls the renewal of output data to ports $O_1$ to $O_{12}$. The number of division of the difference (Vsb−Vsa) and the ratio of each of the correction values ΔVs1, ΔVs2, ... against the difference (Vsb−Vsa) are stored in the clutch control program.

As described hereinbefore, in the second and subsequent time segments (l≧1), CPU 91 increments k with the period tt=0.05 or 0.1 sec, reads a data Vsx, corrects it and sets at output ports $O_1$ to $O_{12}$, resets k into 1 and increments l when k=9 and reading θ and Ne, determines i and j when l is incremented. When the output Cp is equal to or exceeding Vsm, CPU 91 sets the flag and the 0.5 sec timer then skips the reading out of the data from ROM. After the time over of 0.5 sec, CPU 91 reading No and Ne calculates actual slip rate e=No/Ne and sets Cp=Vsml when e exceeds 1.

(6) Clutch control at the change of speed stage of transmission—refer to FIG. 6h When the microprocessor system 400 provides the interrupt terminal INTA of CPU 91 with a low signal "0", CPU 91 clears (stores "0") all of registers i, j, k and l, sets output ports $O_1$ to $O_{12}$ the data Vs1 which indicates release (OFF) of clutch 30 (Cp=Vs1) and informs the system 400 "clutch OFF". The system 400 in response to the information, starts the change of the speed state and withdraws the low signal "0" namely supplies a high signal "1" to the interrupt terminal INTA of CPU 91 after the change of the speed stage. In response to the high signal "1", CPU 91 returns to the flow line ③ shown in FIG. 6a then enters in the clutch control described aforesaid (2) and so on. As described above, CPU 91 sets "clutch OFF" with an interrupt program immediately in response to the low signal "0" in any execution of the clutch control of CPU 91. Therefore, precisely speaking, the clutch OFF control responding to the low signal "0" is not included substantially in the main flow shown in FIGS. 6a through 6l. However to simplify the description and understanding, "clutch OFF" control in response to the low signal "0" is added in FIGS. 6h and 6j.

"Clutch OFF" control in response to the change of the speed stage of the transmission may be executed other than through the interruption. In this case, a "change of speed stage" signal line from the system 400 may be connected to an input port of CPU 91, the input port is not an interrupt port, and CPU 91 may read the input port at appropriate stages and execute "clutch OFF" control in the main flow as shown in FIGS. 6h and 6j.

(7) Clutch control when starting on a down slope and when applying an engine brake—refer to FIGS. 6a, 6j, 6k and 6l When starting on a down slope, if the slope has a small inclination, or the vehicle remains running with e<1 after a clutch OFF in response to the shift lever position N, P or the change of the speed stage of the transmission, the operation is similar to that described above in connection with a normal starting. Because the vehicle load dNe/dt is small, a data group having an increased value of dVs/dt is specified during the segment l=0. Similarly, during the segment l=1, 2, ..., an increased value of $N_e$ causes data groups having an increased value of dVs/dt to be specified, thus allowing an early achievement of e=1 by the clutch control. When the slope is steep, upon starting, or the vehicle remains running after a clutch OFF in response to the shift lever position N, P or the change of the speed stage of the transmission with e=1 without any application of the engine power thereto. In this case as described in the column (2), CPU 91 clears registers i, j, k and l then proceeds to the flow line ⑲ shown FIG. 6j and executes a different clutch ON control (engine braking control because e≧1). In the different clutch ON control shown in FIGS. 6j, 6k and 6l, CPU 91 at first sets k=1 and sets i=10 when e≦2 or i=11 when e>2. Namely CPU 91 selects either one of two data groups by e. One of the groups is selected by i=10, j=0 and k=1 to 33 whereas the other of the groups is selected by i=11, j=0 and k=1 to 33. Of course a speedy clutch ON control is possible when e≧1; moreover a further speedy clutch ON control is possible when e≧2 and it is preferable to speed up the clutch ON control. Therefore the rate of change in the engagement of the clutch (dVsx/dt) of the data groups is relatively high. The rate of change of the latter group selected by i=11 is higher than that of the former group selected by i=10.

CPU 91 reading out Vsx from ROM by addressing it with i, j, k and l sets Vsx to ports $O_1$ to $O_{12}$ in turn with incrementing k with the period 0.05 sec without resetting k even if k≧9. When the signal at the interrupt port INTA falls to "0", CPU 91 jumps to the clutch OFF control described in the column (6) hereinbefore. Also CPU 91 sets the flag and the 0.5 sec timer when the output Cp indicates Vsm, then skips the reading out of the data Vsx from ROM, resets flipflop FF1 and reads the shift lever position Sp. CPU 91 returns to the initialization when the shift lever position Sp is neutral N or parking P otherwise reads the throttle opening $\theta$ and the rotational speed Ne of the drive shaft of the clutch 30. Vsml is set to output ports $O_1$ to $O_{12}$ after the time over of the 0.5 sec timer. If k=33 before Cp=Vsm, namely k is incremented up to 33 when the output Cp at ports $O_1$ to $O_{12}$ is less than Vsm, CPU 91 resets flipflop FF1 and proceeds to the reading the shift lever position Sp, the throttle opening $\theta$ and the speed Ne.

Thereafter CPU 91 judges with $\theta$ and Ne whether the complete clutch ON coupling of clutch 30 will be maintained (Ne≧900 rpm and $\theta$>50%, otherwise, Ne≧1200 rpm and $\theta$<50%) or not, then CPU 91 proceeds to a flow line ⑦ to release clutch 30 when $\theta$ and Ne are in a clutch OFF region in which the complete coupling is not maintained. When $\theta$ and Ne are out of the region, CPU 91 watches the shift lever position Sp. CPU 91 returns to the initialization shown in FIG. 6a when the position Sp is changed to neutral N or parking P. FIG. 8c shows a region in which the complete clutch ON coupling will be maintained and the clutch OFF region. If the complete clutch ON coupling should be maintained in the clutch OFF region, the engine might stop.

Figure 8D:
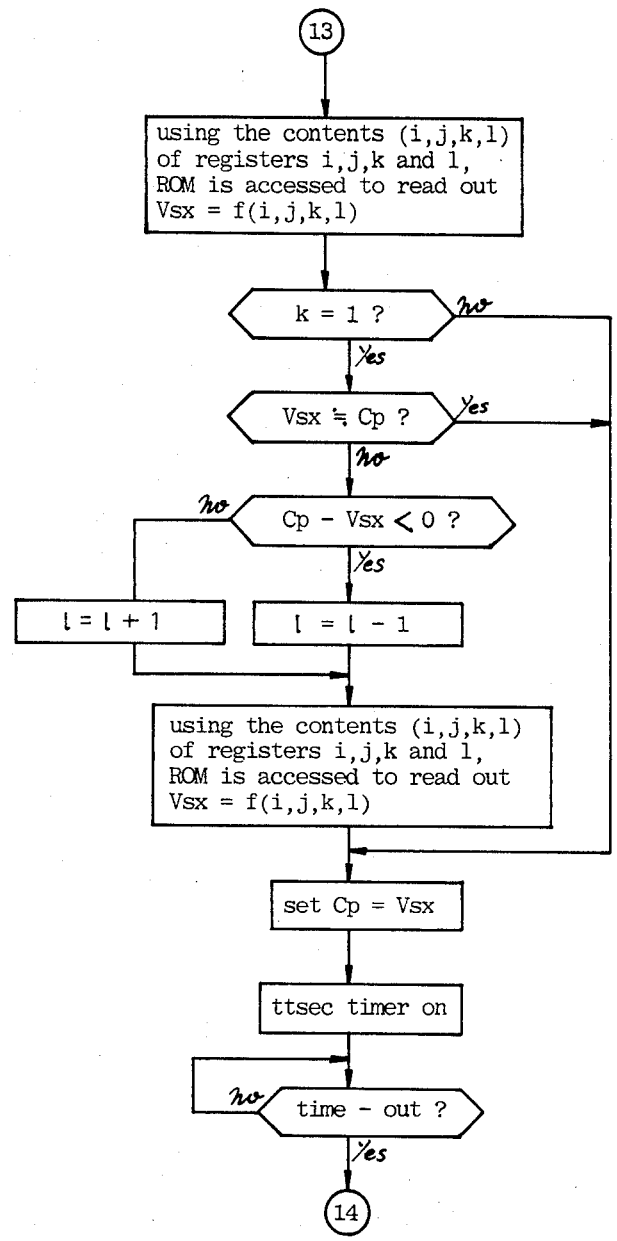
FIG. 8d is a flowchart illustrating a clutch control operation of another embodiment of the invention.

According to the embodiment described hereinbefore, the output Cp is corrected or compensated to smooth the rate of increase of the control pressure of clutch 30 as previously described referring to FIG. 8b. According to another embodiment of the invention, the correction or compensation is executed with a flow shown in FIG. 8d which may be replaced at the position of FIG. 6g. In this case, if a first data (k=1, e.g. point h in FIG. 8b) of an updated data group A (e.g. h-d in FIG. 8b) has no smooth continuity with the output Cp (e.g. point b in FIG. 8b) at ports $O_1$ to $O_{12}$, this means that Cp−h<0 ($\theta$ is increased during the time segment l=0), CPU 91 decrements l by 1 (1→0) and reads out a data group A of the time segment l=0 to pick up k number $k_{sa}$ at which the read out data i≈b. CPU 91 stores $k_{sa}$ in register k then sets the data i to ports $O_1$ to $O_{12}$ (Cp=i) and sets the 0.5 sec timer. After the 0.5 sec timer is over, CPU 91 increments k and reads out a next data from ROM by addressing it with i, j, k and l, and so on. If a first data (k=1, e.g. point a in FIG. 8b) of an updated data group B (e.g. a−l in FIG. 8b) has no smooth continuity with the output Cp (e.g. point b in FIG. 8b) at ports $O_1$ to $O_{12}$, this means that Cp−a>0 ($\theta$ is decreased during the time segment l=0), CPU 91, without decrementing l, reads out a data group B of the time segment l=1 to pick up k number $k_{sb}$ at which the read out data j≈b. CPU 91 stores $k_{sb}$ in register k then sets the read out data j to ports $O_1$ to $O_{12}$ (Cp=j) and sets the 0.5 sec timer. After the 0.5 sec timer is over, CPU 91 increments k and reads out a next data from ROM by addressing it with i, j, k and l, and so on.

While an embodiment of the invention has been shown and described above, it should be understood that the invention can be carried out in other manners as well. By way of example, the throttle opening sensor 12 may be replaced by a potentiometer, contact electrode or absolute rotary encoder employing a photo-interrupter, and if required, may be combined with an A/D converter for purposes of digital conversion. The only requirement is that the sensor be capable of converting a throttle opening or any associated physical quantity into an electrical signal. The same is true for the detection of the rotational speed of the drive shaft and the driven shaft of the clutch. In this instance, a photo-encoder or tachometer may be used. Alternatively, the pulse counter may be replaced by an integrating circuit, and the resulting analog speed signal converted by means of an A/D converter. Also, in the electronic control system, the microprocessor unit 90 may be replaced by a combination of ROM and a counter circuit which sets up an address, with the read-out of data from the ROM being controlled by means of logical gates, flipflops and counters.

What we claim is:

1. An automatic clutch control system for a vehicle of the type having an engine for driving a drive shaft, said engine having a throttle, and said vehicle further comprising a clutch for coupling said drive shaft to a driven shaft, said system comprising:
   first speed detecting means for detecting a rotational speed of said drive shaft;
   second speed detecting means for detecting the rotational speed of said driven shaft;
   throttle detecting means for detecting the throttle opening of said engine;
   clutch engagement control means for controlling the degree of engagement of said clutch in accordance with a clutch engagement control signal; and
   electronic control means coupled to said first and second speed detecting means, said throttle detecting means and said clutch control means, for specifying, with a predetermined time period, a particular group of controlling signal data, which is assigned to a time segment corresponding to said period for clutch engagement control, in accordance with at least the rotational speed of the driven shaft of the clutch and the throttle opening, and applying successive data in the particular group to the clutch engagement control means at a given subinterval of a divided length of the time segment, said electronic control means, after the specification of a subsequent particular group of controlling signal data, comparing the first data of the subsequent group with the last data of a preceding particular group of controlling signal data and correcting the data assigned to a subsequent time segment.

2. An automatic clutch control system according to claim 1 in which the electronic control means calculates the difference between the last data of the preceding particular group and the first data of the subsequent particular group, divides the difference into one or more correction segments and then distributes the correction segments to one or more data of said subsequent particular group.

3. An automatic clutch control system according to claim 1 in which the electronic control means, providing that said difference exceeds a predetermined value, specifies another particular group including a data having substantial continuity with the last data of the preceding particular group and neither the first nor the last in said another group and then applies said data having substantial continuity and successive data in said another particular group to the energizing means at the given subinterval of the divided length of the time segment.

4. An automatic clutch control system according to claim 1 in which said electronic control means includes rate change detection means for determining the rate of change of said rotational speed of said drive shaft, said electronic control means, prior to specifying said particular group of controlling signal data, generating a first clutch engagement control signal representing a degree of engagement dependent upon the rotational speed of said drive shaft and the throttle opening until the rotational speed of said drive shaft exceeds a predetermined value, and generating, after application of said first clutch engagement control signal, a subsequent clutch engagement control signal respresenting a degree of engagement dependent upon (i) the rate of change of said drive shaft rotational speed (ii) the throttle opening and (iii) elapsed time.

5. An automatic clutch control system according to claim 1, wherein said electronic control means includes memory means for storing a plurality of clutch engagement control data groups, means for specifying a particular one of said data groups in accordance with said rate of change and in accordance with said throttle opening, means for reading a sequence of data out of said specified group and means for sequentially generating a plurality of different clutch engagement control signals corresponding to successive data from said particular group read out of said memory means.

6. An automatic clutch control system as set forth in claim 1, wherein said system further comprises means for providing instructions to said electronic control means for a clutch control mode including a mode of temporary clutch activation over an increased time period, said electronic control means in responding to said instruction indicating the mode of temporary clutch activation, increases the time interval for reading the sequence of data out of said specified group.

7. An automatic clutch control system according to claim 1, wherein said electronic control means includes rate change detection means for determining the rate of change of said rotational speed of said drive shaft, said electronic control means generating a first clutch engagement control signal representing a degree of engagement dependent upon the rotational speed of said drive shaft and the throttle opening until the rotational speed of said drive shaft exceeds a predetermined value and applying said signal to said clutch engagement control means, for generating and applying, after application of said first clutch engagement control signal, a subsequent clutch engagement control signal representing a degree of engagement dependent upon (i) the rate of change of said drive shaft rotational speed, (ii) the throttle opening and (iii) elapsed time, and for thereafter generating and applying a clutch engagement control signal representing a degree of engagement dependent upon (i) the rotational speed of said driven shaft and (ii) the throttle opening.

8. An automatic clutch control system as set forth in claim 7, wherein said electronic control means includes memory means for storing a plurality of clutch engagement control data groups, means for specifying a particular one of said data groups in accordance with said rate of change and in accordance with said throttle opening, means for reading a sequence of data out of said specified group and means for sequentially generating a plurality of different clutch engagement control signals corresponding to successive data from said particular group read out of said memory means.

9. An automatic clutch control system as set forth in claim 8, wherein said system further comprises means for providing instructions to said electronic control means for a clutch control mode including a mode of temporary clutch activation over an increased time period, said electronic control means in responding to said instruction indicating the mode of temporary clutch activation, increases the time interval for reading the sequence of data out of said specified group.

* * * * *